(12) United States Patent
Morita et al.

(10) Patent No.: US 11,865,994 B2
(45) Date of Patent: Jan. 9, 2024

(54) DRIVER'S SEAT AIRBAG DEVICE

(71) Applicant: Autoliv Development AB, Vargarda (SE)

(72) Inventors: Kazuki Morita, Kanagawa (JP); Kazuhiro Abe, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 46 days.

(21) Appl. No.: 17/595,897

(22) PCT Filed: Apr. 9, 2020

(86) PCT No.: PCT/JP2020/015922
§ 371 (c)(1),
(2) Date: Nov. 29, 2021

(87) PCT Pub. No.: WO2020/241079
PCT Pub. Date: Dec. 3, 2020

(65) Prior Publication Data
US 2022/0234537 A1   Jul. 28, 2022

(30) Foreign Application Priority Data
May 30, 2019   (JP) .................................. 2019-101302

(51) Int. Cl.
*B60R 21/203*   (2006.01)
*B60R 21/205*   (2011.01)
(Continued)

(52) U.S. Cl.
CPC ...... *B60R 21/231* (2013.01); *B60R 21/01512* (2014.10); *B60R 21/203* (2013.01); *B60R 21/205* (2013.01); *B60R 2021/23107* (2013.01)

(58) Field of Classification Search
CPC ........ B60R 2021/23107; B60R 21/203; B60R 21/205; B60R 21/231
See application file for complete search history.

(56) References Cited

U.S. PATENT DOCUMENTS

| 7,942,443 B2 | 5/2011 | Dennis et al. |
| 2008/0048420 A1 * | 2/2008 | Washino ............... B60R 21/203 280/731 |

FOREIGN PATENT DOCUMENTS

| DE | 19860804 A1 * | 7/2000 | ......... B60R 21/2032 |
| DE | 10021845 A1 | 11/2001 | |

(Continued)

OTHER PUBLICATIONS

Microfilm of the specification and drawings annexed to the request of Japanese Utility Model Application No. 9311/1972 (Laid-open No. 85325/1973) (Nissan Motor co., LTD.) Oct. 17, 1973 (Oct. 17, 1973) specification, p. 2, line 10 to p. 4, line 13, fig. 1, 2, 4, 6.

*Primary Examiner* — Keith J Frisby
(74) *Attorney, Agent, or Firm* — Foley & Lardner LLP

(57) ABSTRACT

A driver seat airbag device restrains an occupant seated in a driver seat of a vehicle, and includes, a chest protecting cushion that expands and deploys behind a yoke steering wheel; and a head protecting cushion that expands and deploys adjacent to and above the chest protecting cushion. The head protecting cushion extends from an upper portion of the chest protecting cushion to an upper surface of an instrument panel when expanded and deployed, and contacts and restrains the head of the occupant from the front.

9 Claims, 18 Drawing Sheets

(51) Int. Cl.
    *B60R 21/231*     (2011.01)
    *B60R 21/015*     (2006.01)

(56)         References Cited

FOREIGN PATENT DOCUMENTS

| | | | |
|---|---|---|---|
| JP | 48-85325 | * | 10/1973 |
| JP | 9-240406 | A | 9/1997 |
| JP | 2008-49858 | A | 3/2008 |
| JP | 2008-520481 | A | 6/2008 |

* cited by examiner

[FIG. 1]
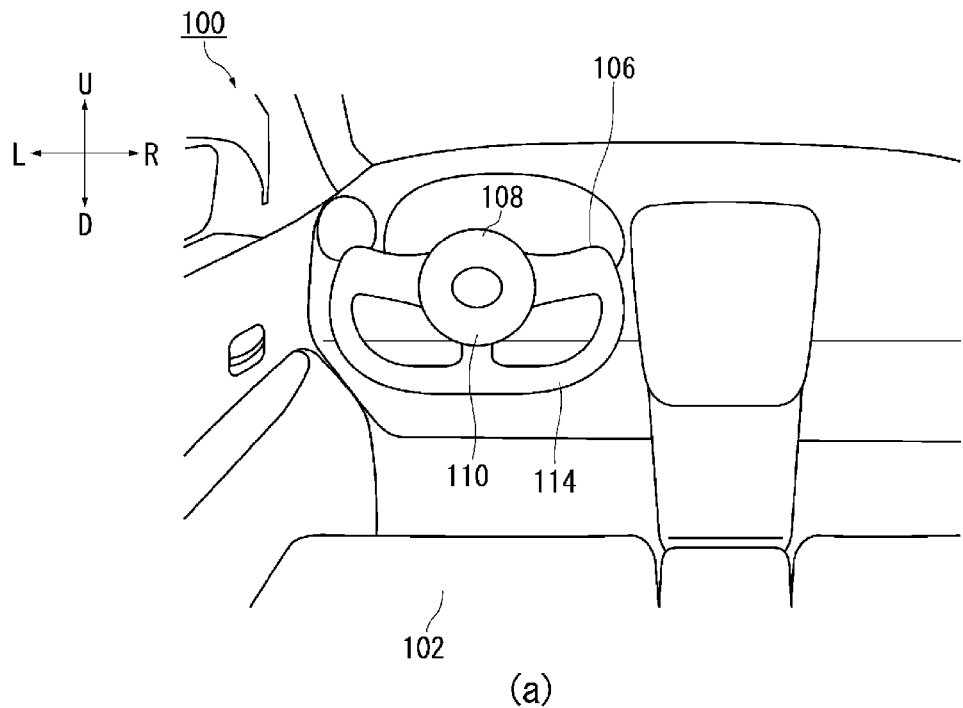
(a)
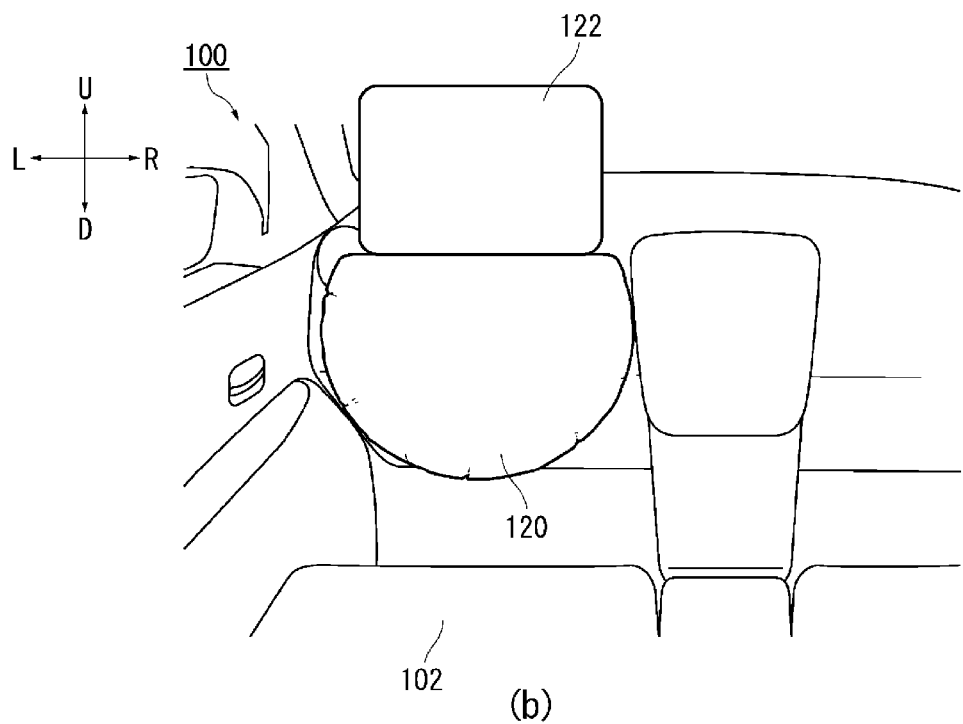
(b)

[FIG. 2]
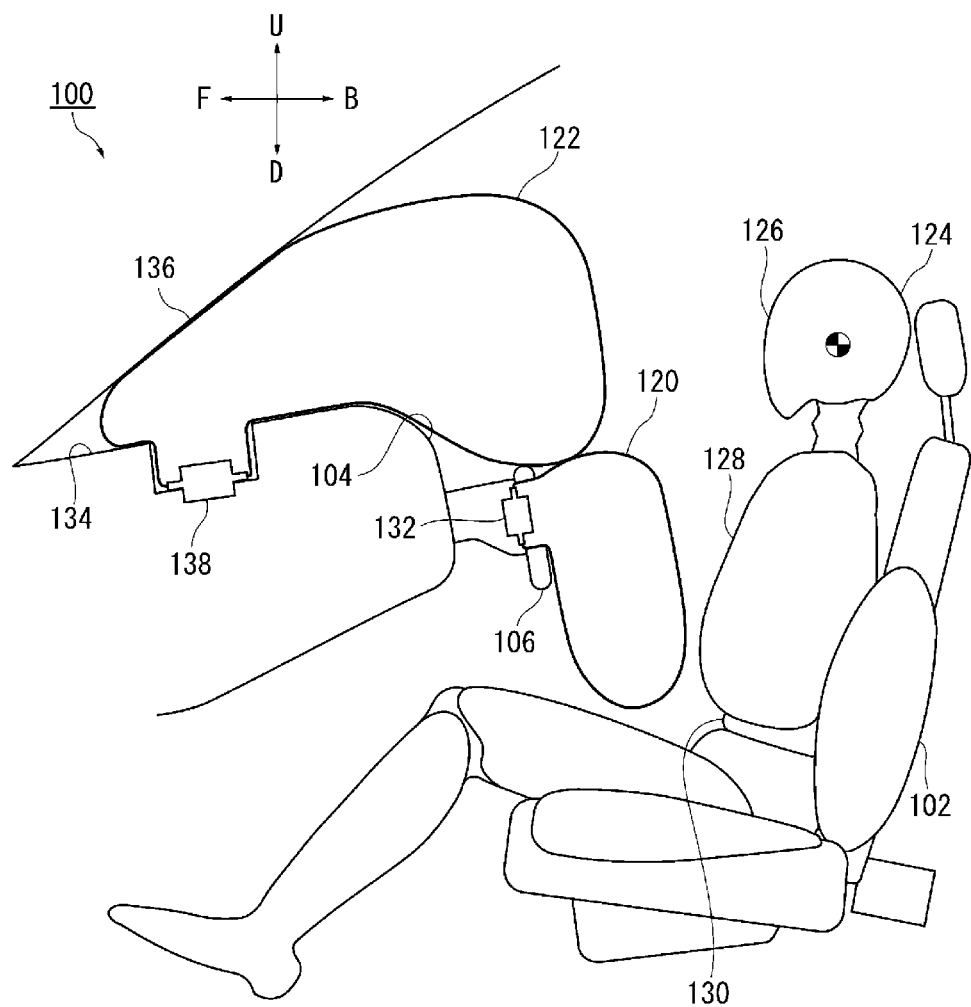

[FIG. 3]
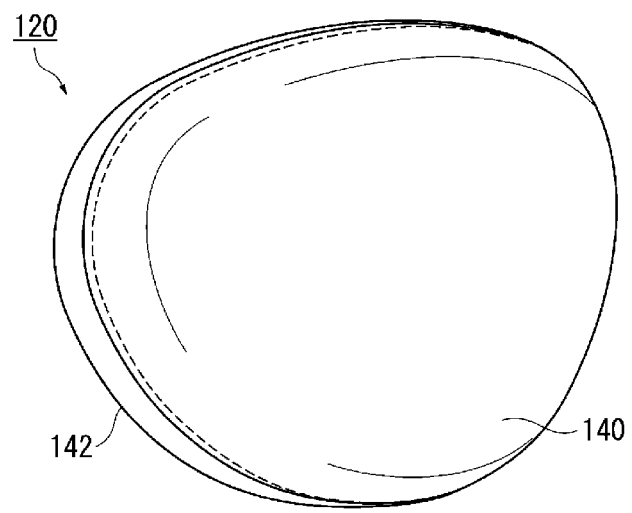
(a)
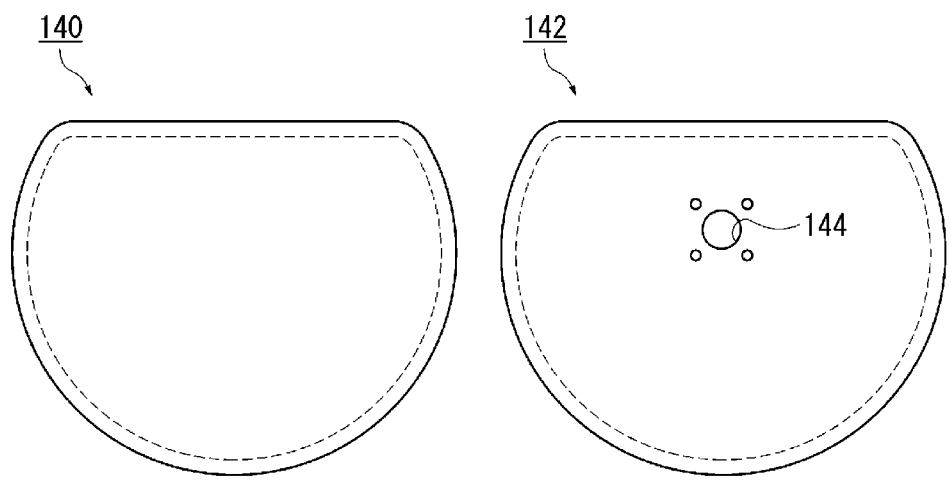
(b)　　　　　　　　(c)

[FIG. 4]
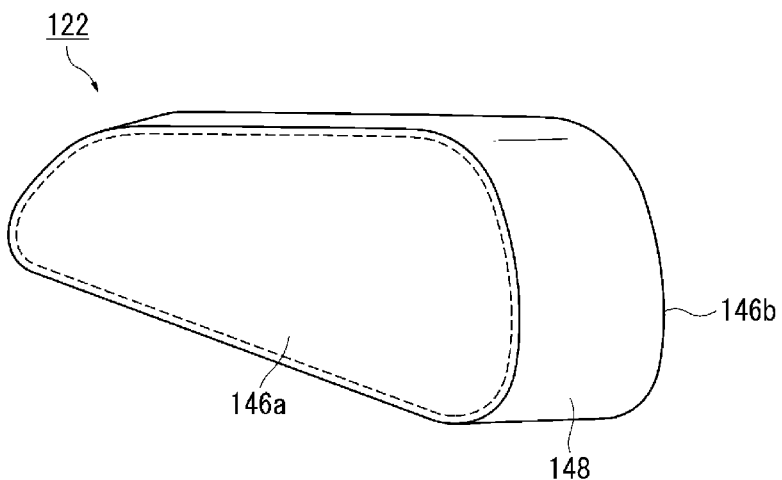
(a)
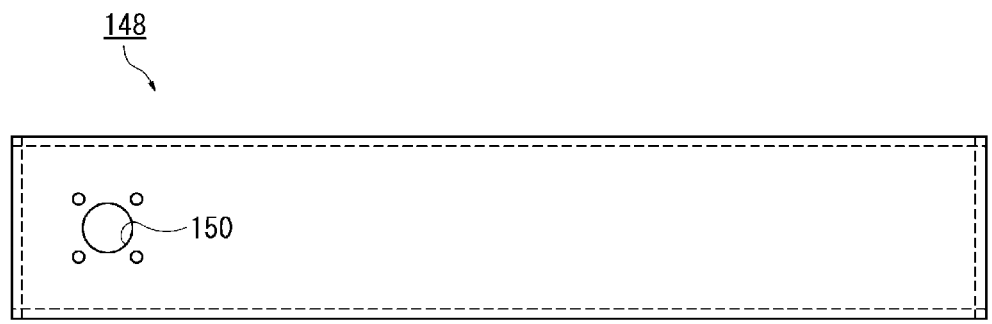
(b)
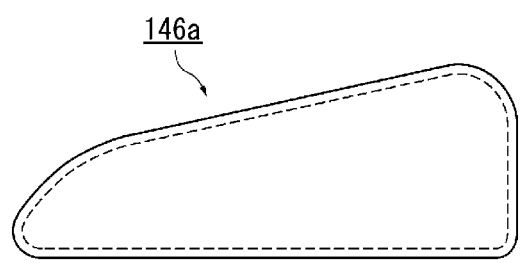
(c)

[FIG. 5]
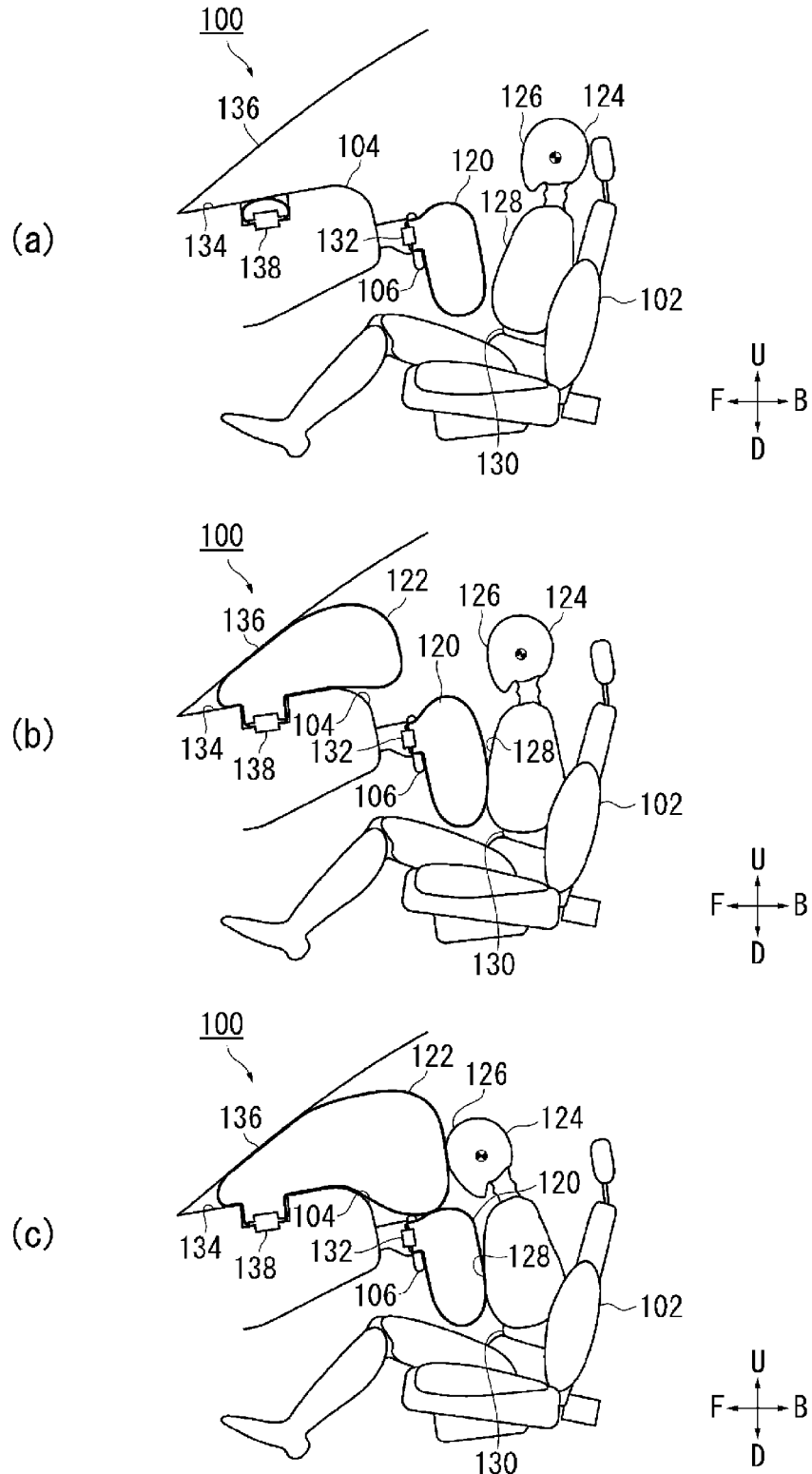

[FIG. 6]
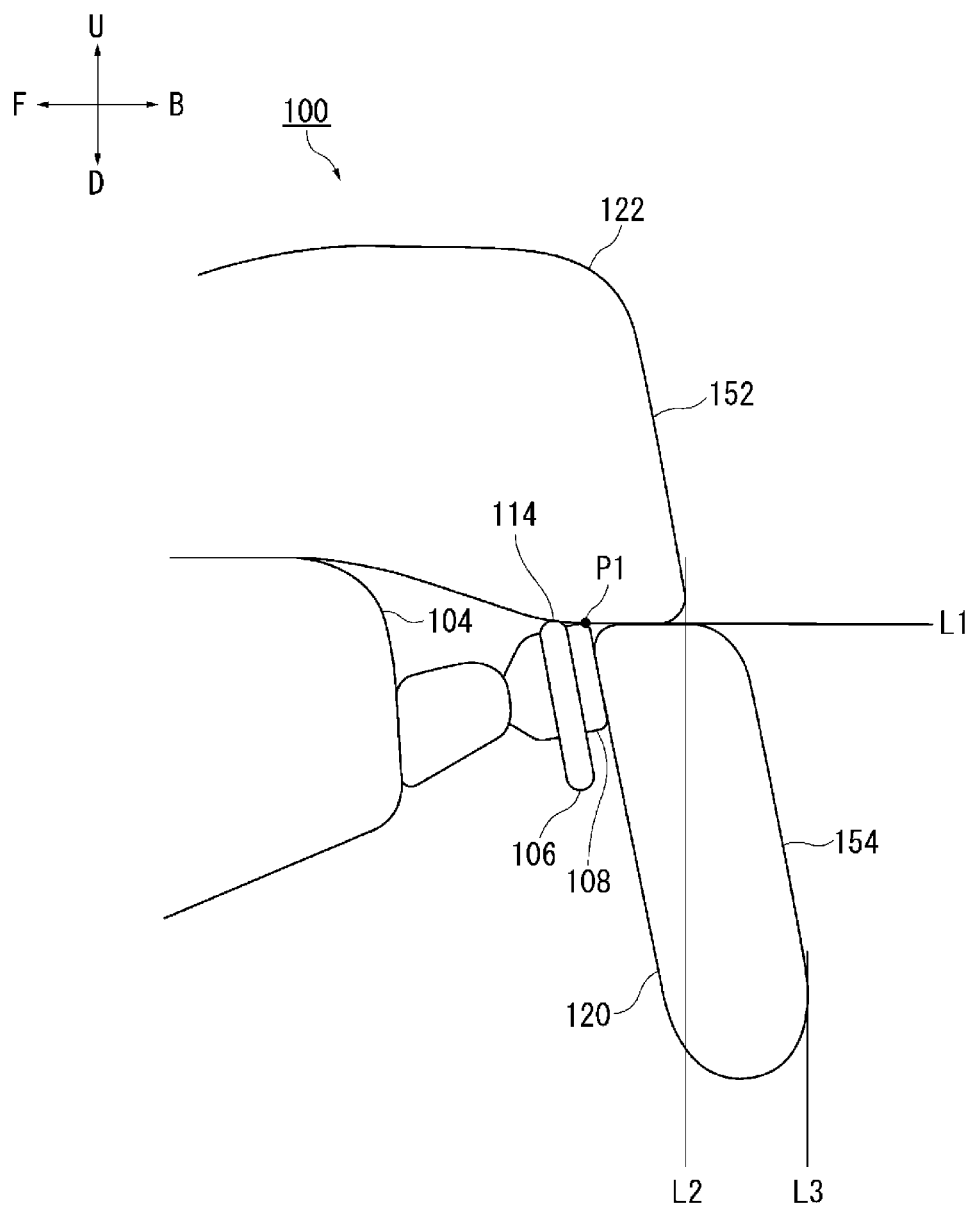

[FIG. 7]
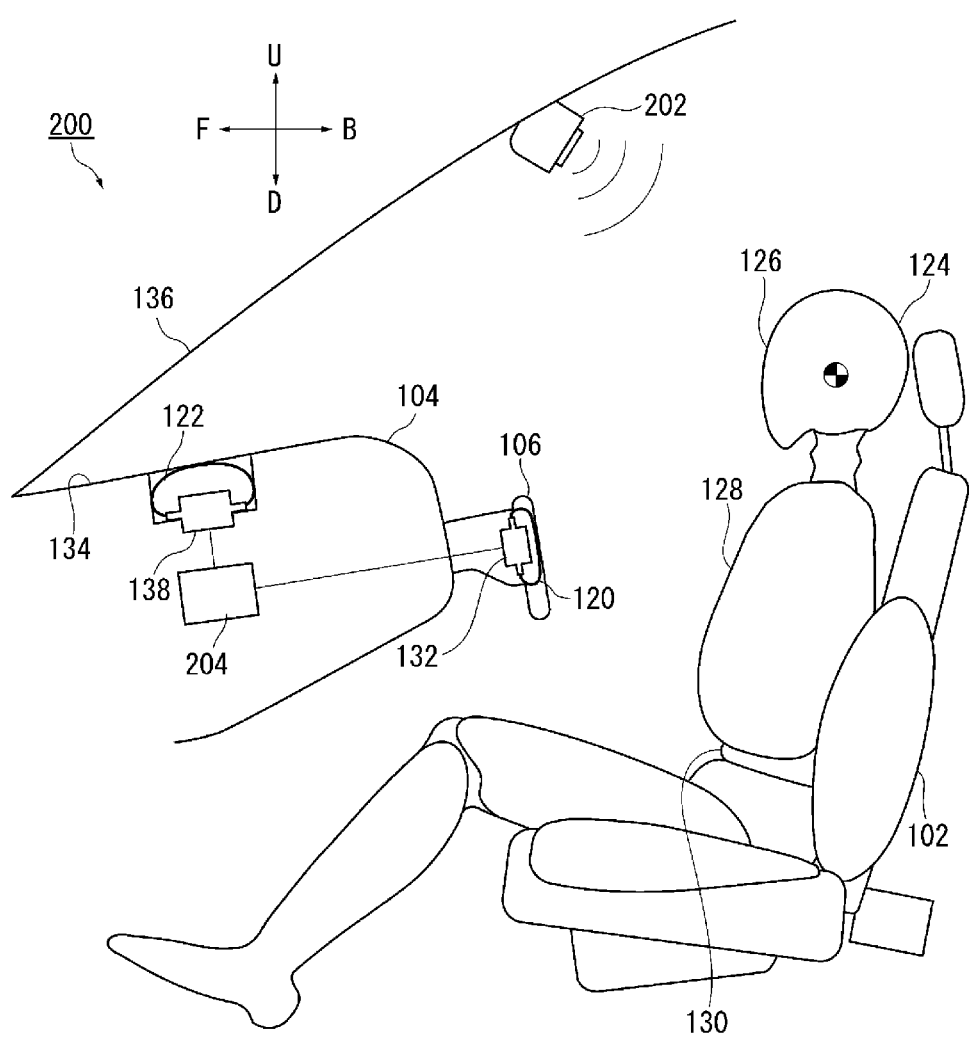

[FIG. 8]
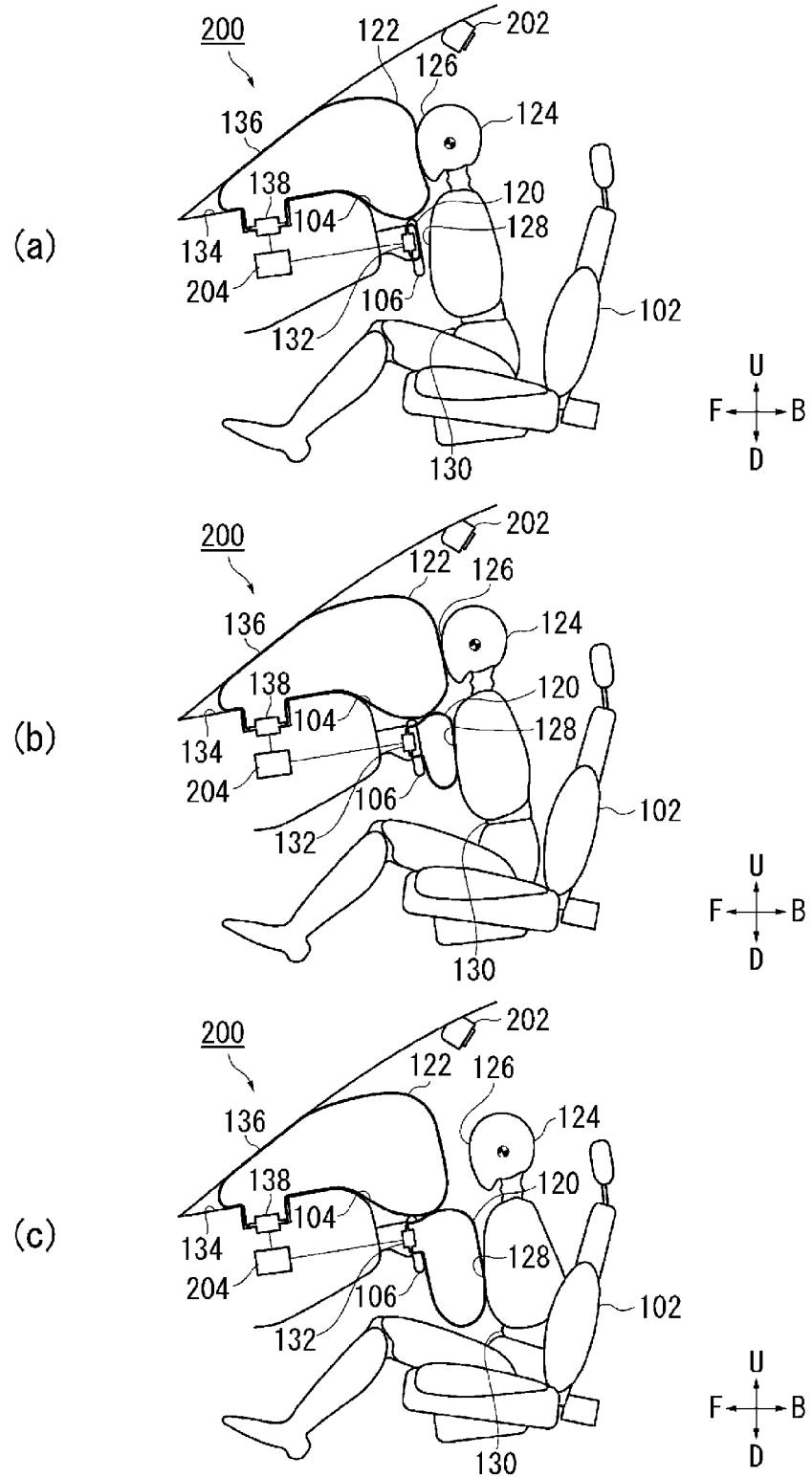

[FIG. 9]
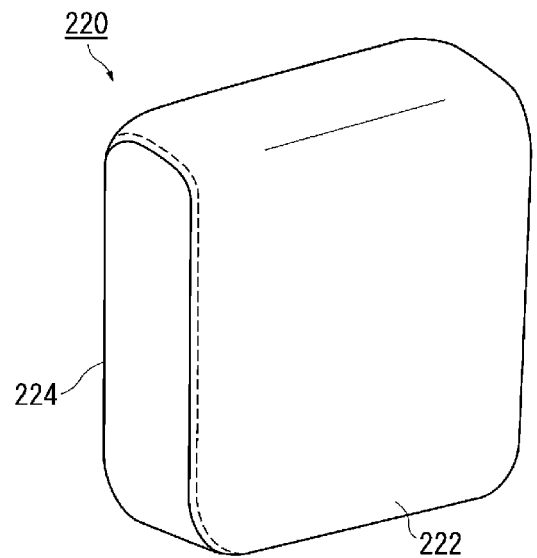
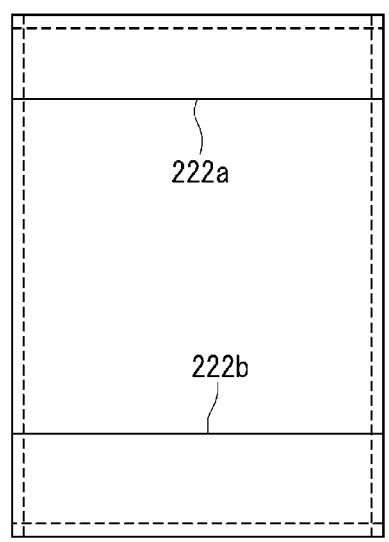
(b)
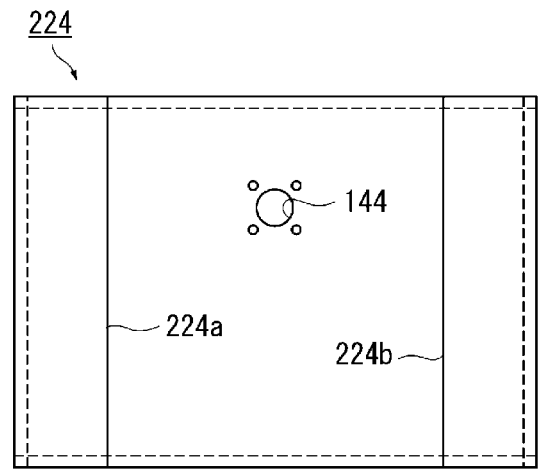
(c)

[FIG. 10]
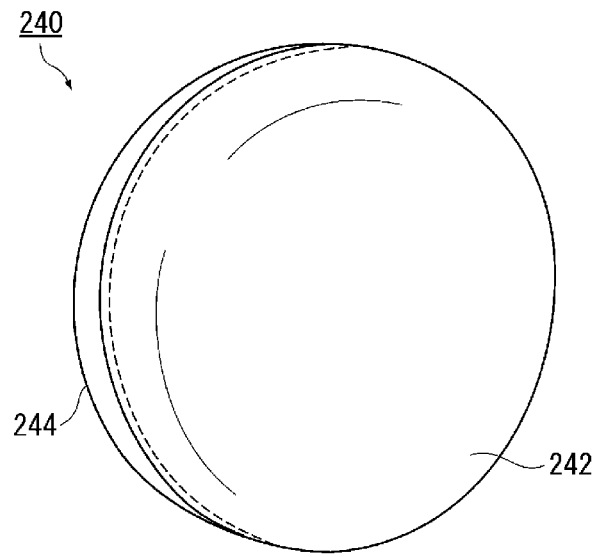
(a)
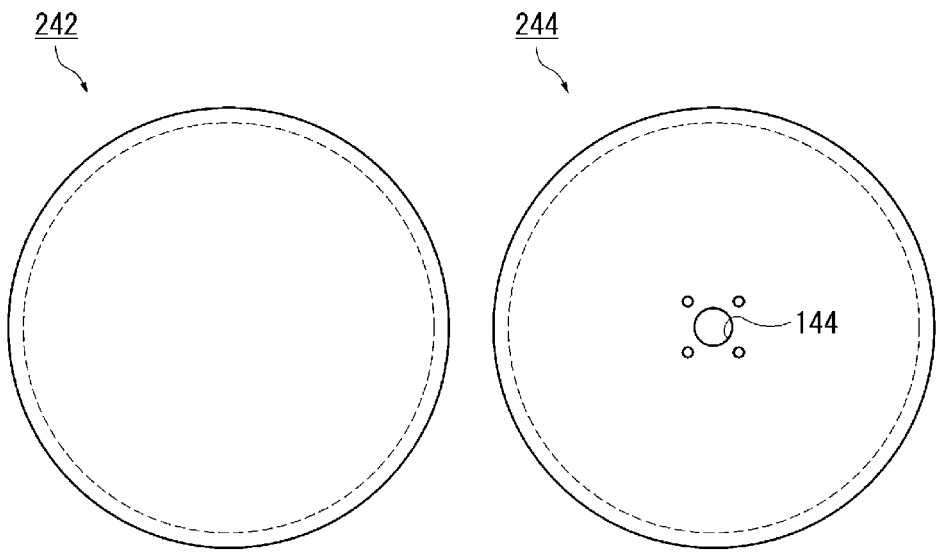
(b)          (c)

[FIG. 11]
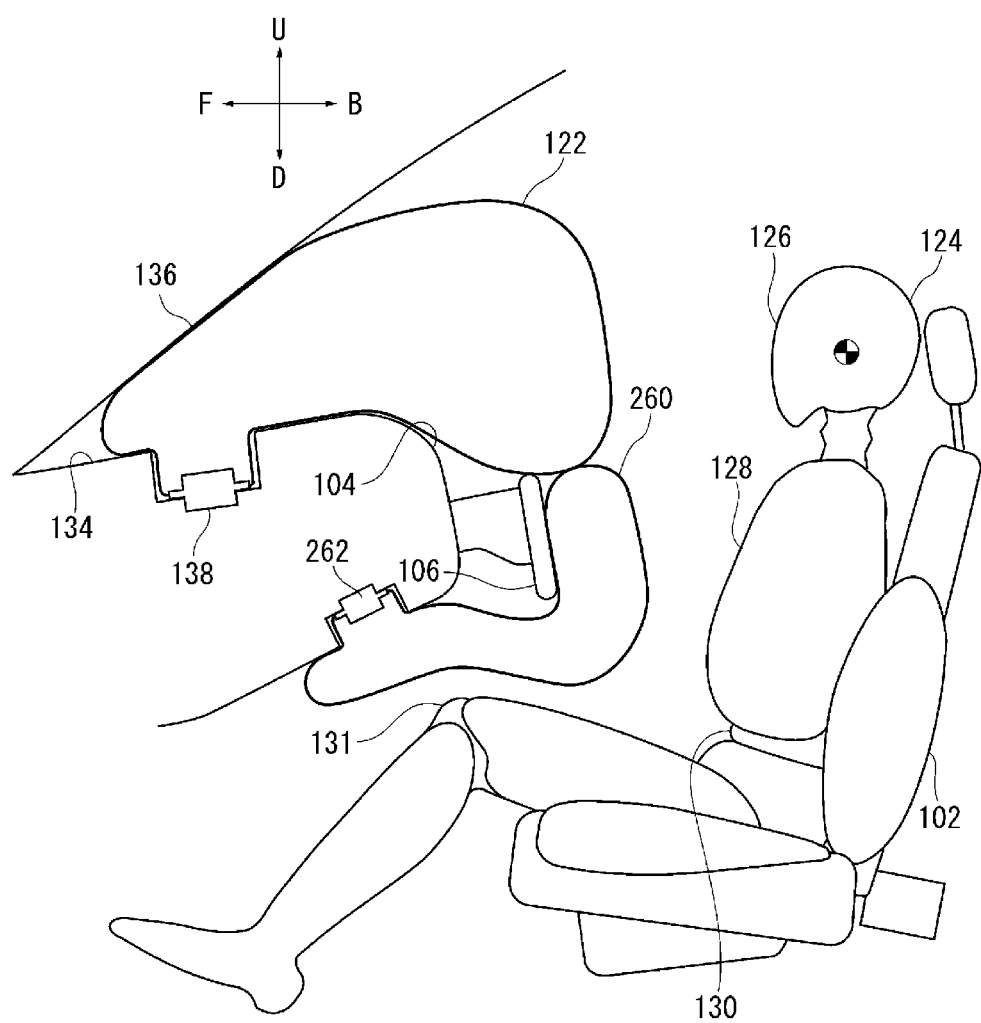

[FIG. 12]
(a)
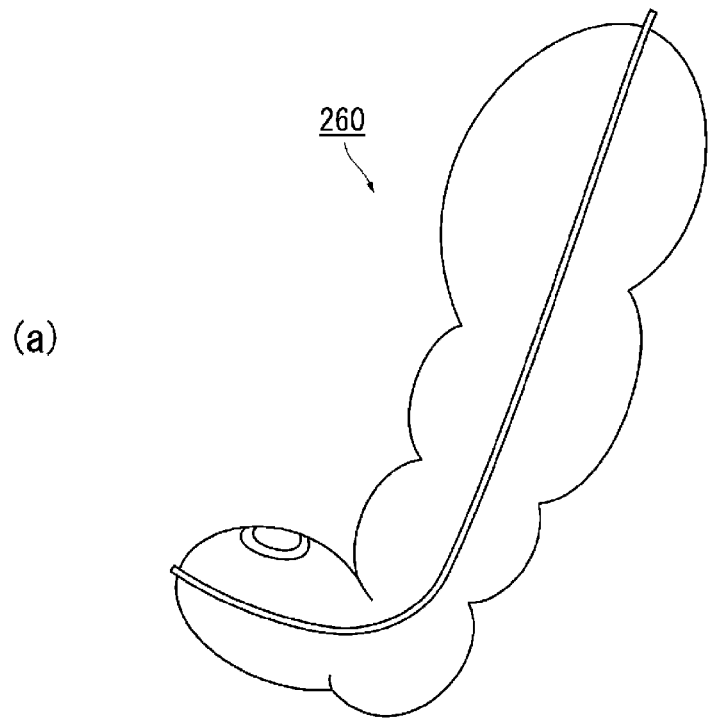
(b)
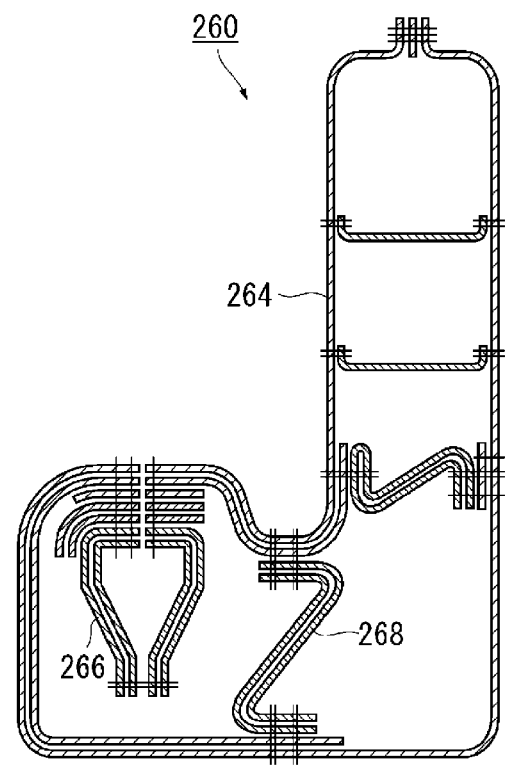

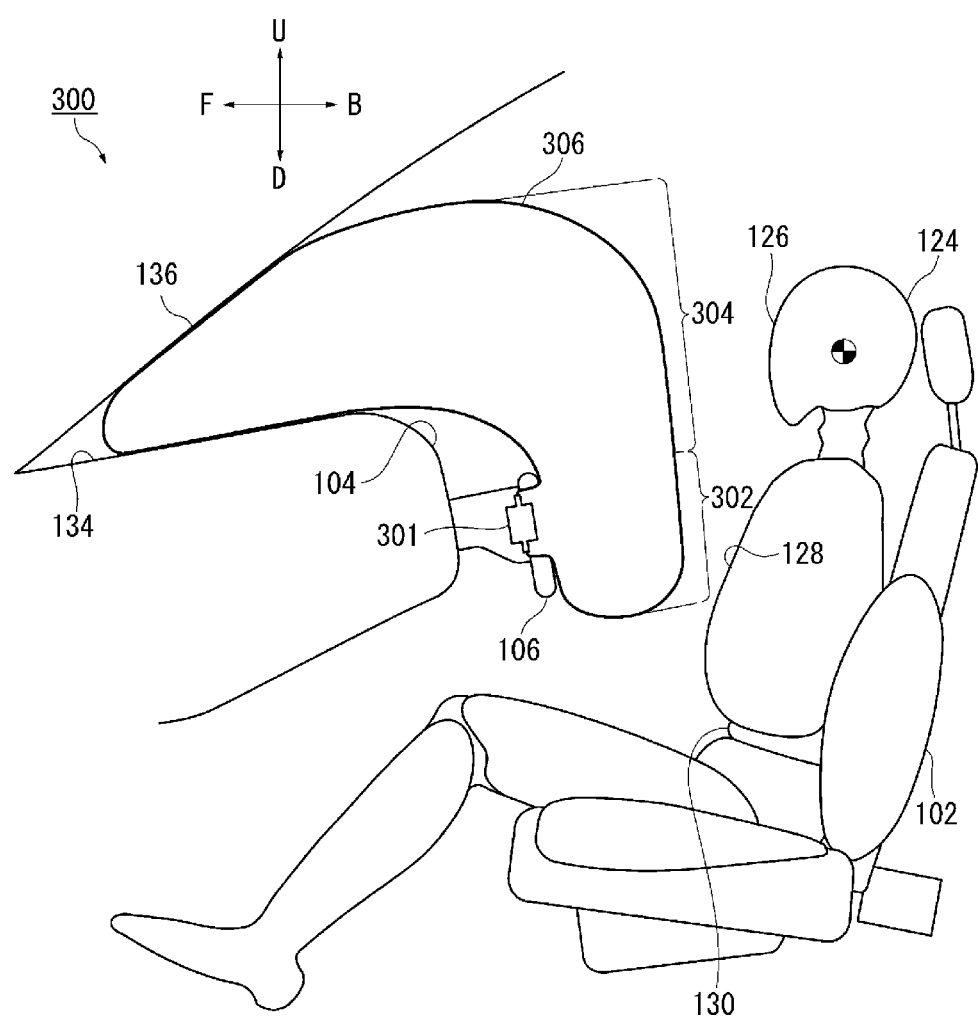
[FIG. 13]

[FIG. 14]
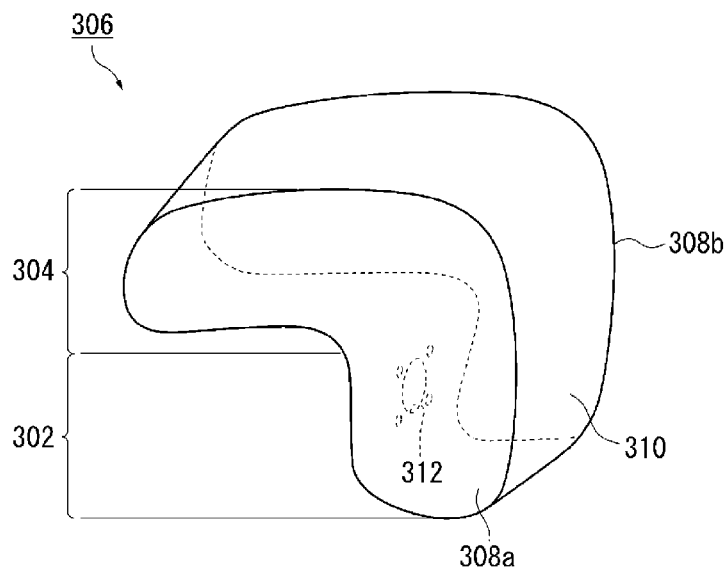
(a)
(b)
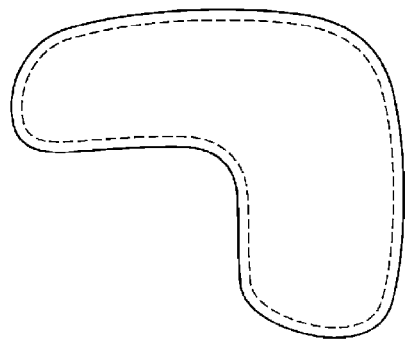
(c)

[FIG. 15]
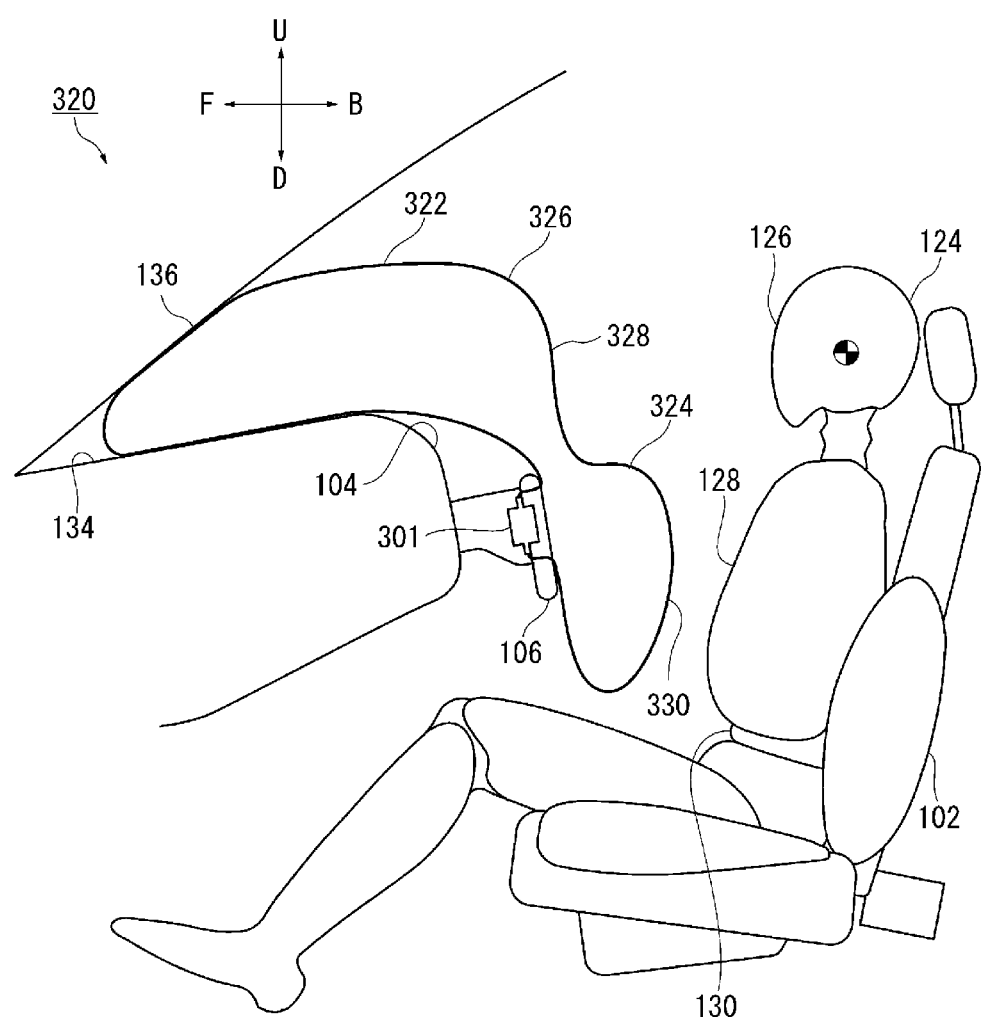

[FIG. 16]
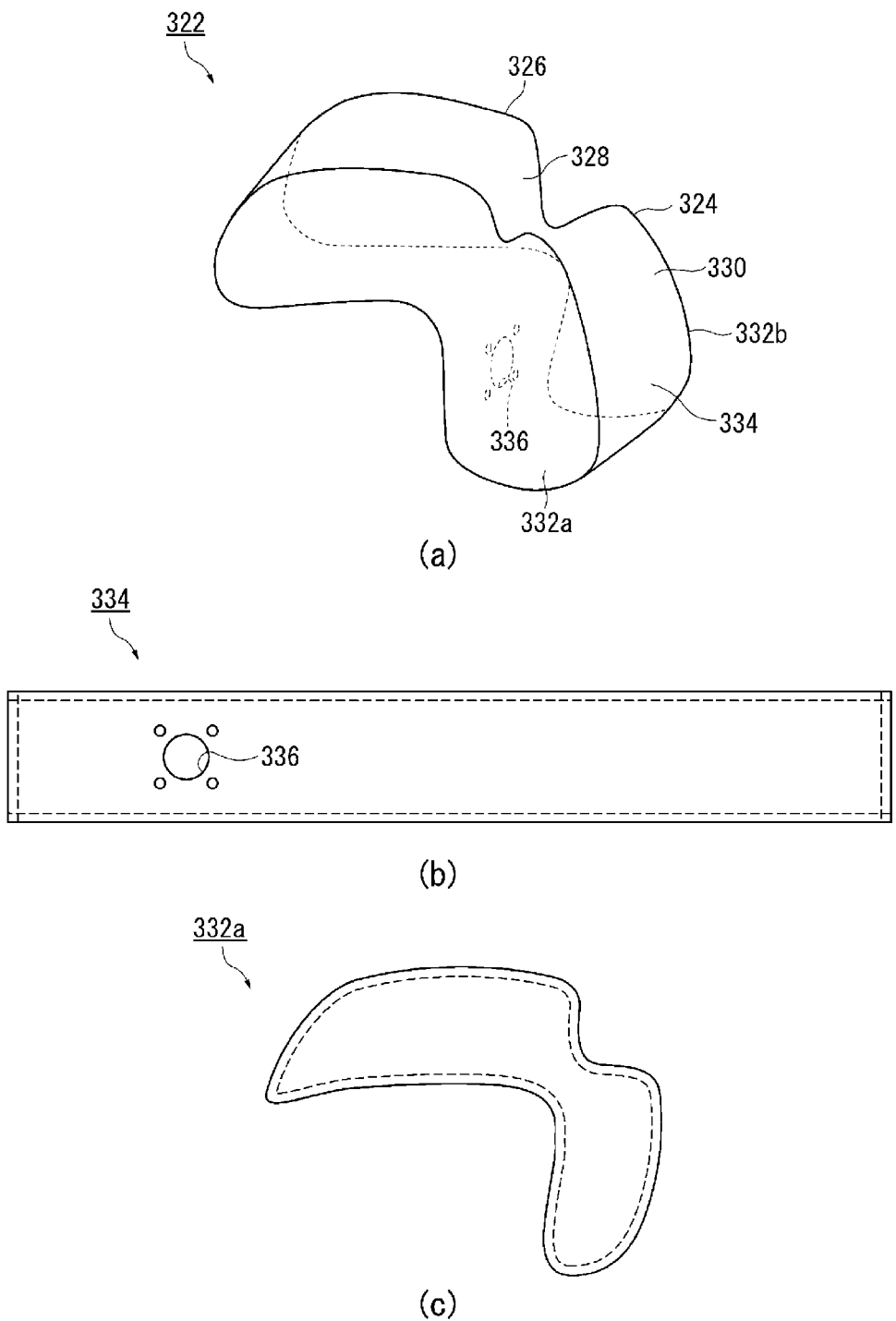

[FIG. 17]
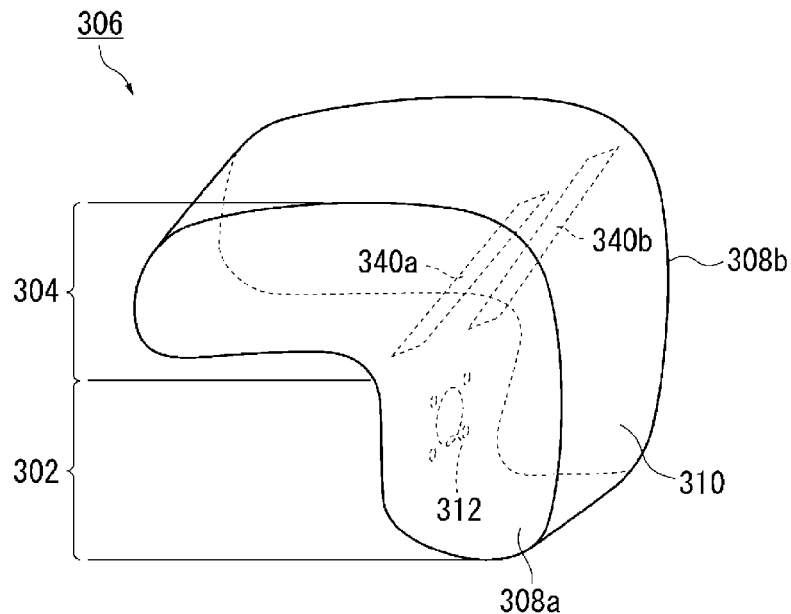
(a)
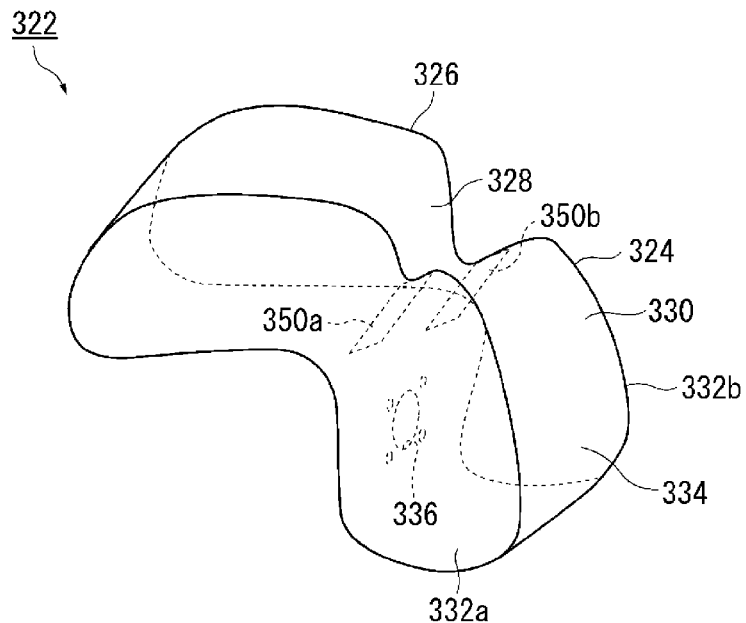
(b)

[FIG. 18]
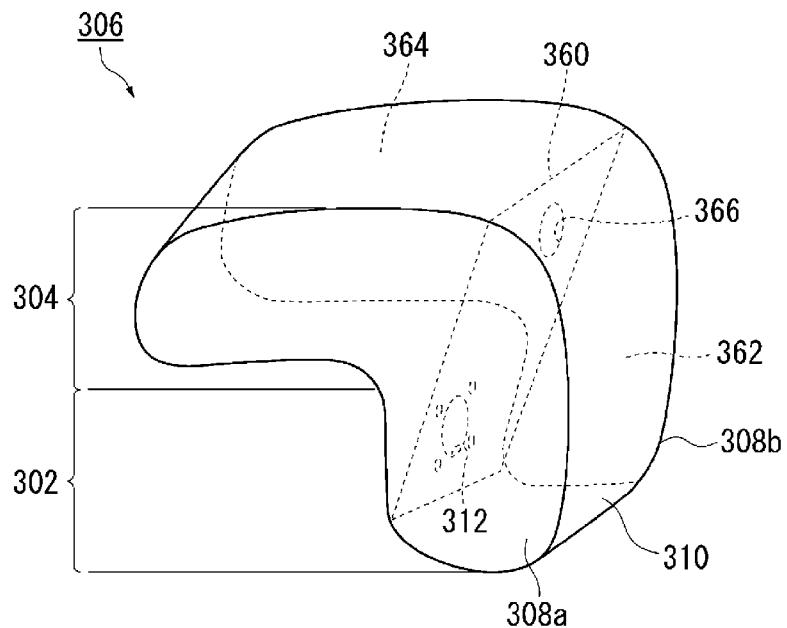
(a)
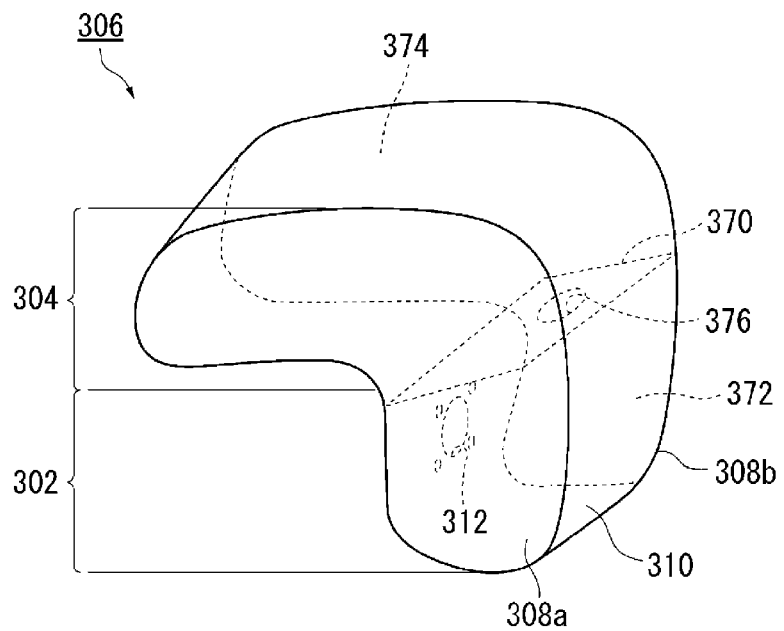
(b)

DRIVER'S SEAT AIRBAG DEVICE

TECHNICAL FIELD

The present invention relates to a drivers seat airbag device for restraining an occupant in an emergency.

BACKGROUND TECHNOLOGY

Airbag devices have generally become standard equipment in vehicles in recent years. An airbag device is a safety device that is actuated in the event of an emergency such as a vehicle collision or the like to receive and protect an occupant by expanding and deploying a bag-shaped airbag cushion with gas pressure. In the case of a front row seat, a typical airbag device is primarily installed in the center of a steering wheel for a driver seat and in an instrument panel in front of an occupant for a front passenger seat.

For example, Patent Document 1 discloses an airbag device for a front passenger seat. In an airbag device of Patent Document 1, an airbag 1 having a large capacity is provided on a rear portion (occupant side) of an instrument panel, and a flat airbag 2 having a small capacity is provided in an upper portion of the instrument panel. An airbag 2 is expanded between the airbag 1 and a windshield 6 to support the airbag 1 from above on a front side.

PRIOR ART DOCUMENTS

Patent Documents

Patent Document 1: German Patent Invention No. 10021845

SUMMARY OF THE INVENTION

The driver seat airbag device is close in distance to the occupant and the steering wheel, and therefore, the airbag cushion must expand and deploy more quickly to prevent the occupant from impacting the steering wheel. At this time, for example, it is difficult for an airbag cushion with a large capacity, such as the airbag 1 of Patent Document 1, to quickly enter the narrow space between the steering wheel and the chest of the occupant.

Furthermore, in recent years, new steering wheels that transmit a steering force to the wheels via an electrical signal are being developed, and steering wheel designs are therefore becoming more diverse. In particular, new electrically connected steering wheels do not need to be significantly rotated, unlike conventional steering wheels which physically transmit steering force via a steering shaft. For example, the rim of new steering wheels does not need to be a circular ring because the grip does not need to be rotated more than 180° while being held by the left and right hands like a conventional rim. Therefore, a new steering wheel can adopt a yoke design other than a circular ring shape, such as rims present on only left and right sides with regard to a central hub (hereinafter, a steering wheel with a rim other than a circular ring shape is referred to as a "yoke steering wheel").

In many cases, with the yoke steering wheel described above, a portion of the rim is omitted, which reduces a contact range with the airbag cushion; thus, the airbag cushion may not be supported, causing the posture of the airbag cushion to tilt. In particular, if an upper rim is omitted, the airbag cushion may collapse toward the front of the vehicle due to a load from the head of the occupant and thus may not fully protect the head of the occupant.

Problem to be Solved by the Invention

In view of the foregoing, an object of the present invention is to provide a driver seat airbag device which can fully restrain the head and chest of an occupant and can be applied to a non-circular steering wheel.

MEANS FOR SOLVING THE PROBLEMS

In order to solve the aforementioned problem, a typical configuration of a driver seat airbag device according to the present invention is a driver seat airbag device that restrains an occupant seated in a driver seat of a vehicle, containing: a chest protecting cushion that expands and deploys behind a steering wheel of the vehicle; and a head protecting cushion that expands and deploys adjacent to and above the chest protecting cushion; where the head protecting cushion extends from an upper portion of the chest protecting cushion to an upper surface of an instrument panel when expanded and deployed, and contacts and restrains the head of the occupant from the front.

With the aforementioned configuration, the chest and head of the occupant can be fully restrained. In particular, the head protecting cushion is supported by the upper surface of the instrument panel, and therefore, the head protecting cushion can efficiently absorb a load from the head without being dependent on the steering wheel and can restrain the occupant in a stable posture.

The volume of the aforementioned head protecting cushion when expanded and deployed may be larger than the volume of the chest protecting cushion when expanded and deployed. With the head protecting cushion of this configuration, the head of the occupant can be fully restrained.

A border between the chest protecting cushion and the head protecting cushion described above may be set at a height near an upper end of a hub of the steering wheel. With this configuration, the chest and head of the occupant can be fully restrained even when an upper range of a steering wheel rim is omitted.

The height near the upper end of the hub described above may be within a range of ±100 mm relative to the upper end of the hub. If the border between the chest protecting cushion and head protecting cushion is set to this height, the chest and head of the occupant can be fully restrained even when an upper range of a steering wheel rim is omitted.

The rim of the steering wheel may be a shape other than circular, a border between the chest protecting cushion and the head protecting cushion may be set at a height near an upper end of the rim of the steering wheel. Even with this configuration, the chest and head of the occupant can be fully restrained.

The height near the upper end of the rim of the steering wheel may be within a range of ±100 mm relative to the upper end of the hub at a center of the steering wheel. Even by setting the border between the chest protecting cushion and head protecting cushion to this height, the chest and head of the occupant can be fully restrained even when an upper range of a steering wheel rim is omitted.

A rear wall of the head protecting cushion described above may be positioned more toward the front of the vehicle than a rear wall of the chest protecting cushion. With this configuration, the occupant can be restrained in a stable posture by first restraining the chest of the occupant and then restraining the head.

A rear end of a rear wall of the head protecting cushion described above may be positioned more toward the front of the vehicle than a rear end of a rear wall of the chest protecting cushion. Even with this configuration, the occupant can be restrained in a stable posture by first restraining the chest of the occupant and then restraining the head.

The head protecting cushion described above may complete expansion and deployment later than the chest protecting cushion. With this configuration, by making the completion of the expansion of the head protecting cushion later than the chest protecting cushion, the chest of the occupant can be restrained first, thereby reducing the load on the head.

The head protecting cushion described above may contact the occupant before the chest protecting cushion. For example, if the occupant leans more forward than a regular seating position, the head is first pushed rearward. Thereby, a space can be secured between the occupant and the steering wheel, and thus the chest protecting cushion can enter between the occupant and the steering wheel.

The chest protecting cushion and the head protecting cushion described above may be separated from each other. With this configuration, a configuration that efficiently restrains the occupant can be achieved, such as by varying the timing of expansion and deployment of the chest protecting cushion and the head protecting cushion, or the like.

The head protecting cushion described above may be stored in an upper portion of the instrument panel toward the front of the vehicle from the steering wheel. This configuration allows the head protecting cushion to be suitably installed in a vehicle.

The chest protecting cushion described above may be stored in the steering wheel. This configuration allows the chest protecting cushion to be suitably installed in a vehicle.

The chest protecting cushion may be stored in a lower portion of an instrument panel more toward the front of the vehicle than the steering wheel, and may be capable of protecting a knee of the occupant. This configuration allows the chest protecting cushion to be suitably mounted in a vehicle and to more fully restrain an occupant.

The driver seat airbag device may further contain: a chest portion inflator that supplies gas to the chest protecting cushion; a head portion inflator that supplies gas to the head protecting cushion; a camera capable of detecting the position of the occupant; and a control unit that controls the activation start time of the chest portion inflator and the head portion inflator, respectively, based on the position of the occupant detected by the camera. With this configuration, the timing of restraining the head and the chest based on the posture of the occupant can be adjusted to efficiently restrain the occupant.

The chest protecting cushion and head protecting cushion described above may be stored in the steering wheel in an integrally connected state. Even with this configuration, an airbag device capable of efficiently restraining the chest and head of an occupant can be achieved.

Effect of the Invention

The present invention can provide a driver seat airbag device that can fully restrain the head and chest of an occupant and can be applied to a non-circular steering wheel.

BRIEF DESCRIPTION OF THE DRAWINGS

FIG. 1 is a diagram illustrating the outline of a driver seat airbag apparatus according to an embodiment of the present invention.

FIG. 1(a) is a diagram illustrating a vehicle before activation of the driver's seat airbag device.

FIG. 1(b) is a diagram illustrating an airbag cushion provided with the driver seat airbag device after expansion and deployment.

FIG. 2 is a diagram illustrating the driver seat airbag device in FIG. 1(b) and an occupant seated in a seat.

FIG. 3 is a diagram illustrating an outline of a chest protecting cushion in FIG. 2.

FIG. 3(a) is a perspective view of the chest protecting cushion in an expanded and deployed state.

FIG. 3(b) is a diagram illustrating the front panel of FIG. 3(a) spread out on a plane.

FIG. 3(c) is a diagram illustrating the rear panel of FIG. 3(a) spread out on a plane.

FIG. 4 is a diagram illustrating an outline of a head protecting cushion in FIG. 2.

FIG. 4(a) is a perspective view of the head protecting cushion in an expanded and deployed state.

FIG. 4(b) is a diagram illustrating the center panel of FIG. 4(a) spread out on a plane.

FIG. 4(c) is a diagram illustrating the side panel in FIG. 4(a).

FIG. 5 is a diagram illustrating a process of the driver seat airbag device in FIG. 2 restraining the occupant.

FIG. 5(a) is a diagram illustrating the driver seat airbag device at the start of activation.

FIG. 5(b) illustrates a condition when the occupant in FIG. 5(a) moves toward the front of the vehicle.

FIG. 5(c) illustrates a condition when the occupant in FIG. 5(b) moves further toward the front of the vehicle.

FIG. 6 is an enlarged view of the driver seat airbag device in FIG. 5(c).

FIG. 7 is a diagram illustrating a first modified example of the driver seat airbag device illustrated in FIG. 2.

FIG. 8 is a diagram illustrating a process of the driver seat airbag device in FIG. 7 restraining the occupant.

FIG. 8(a) is a diagram illustrating the driver seat airbag device at the start of activation.

FIG. 8(b) illustrates a condition where the occupant in FIG. 8(a) moves toward the rear of the vehicle.

FIG. 8(c) illustrates a condition where expansion and deployment of the chest protecting cushion in FIG. 8(b) is completed.

FIG. 9 is a diagram illustrating a first modified example of the chest protecting cushion illustrated in FIG. 3.

FIG. 9(a) is a perspective view of a chest protecting cushion in an expanded and deployed state.

FIG. 9(b) is a diagram illustrating the front panel of FIG. 9(a) spread out on a plane.

FIG. 9(c) is a diagram illustrating the rear panel of FIG. 9(a) spread out on a plane.

FIG. 10 is a diagram illustrating a second modified example of the chest protecting cushion illustrated in FIG. 3.

FIG. 10(a) is a perspective view of a chest protecting cushion in an expanded and deployed state.

FIG. 10(b) is a diagram illustrating the front panel of FIG. 10(a) spread out on a plane.

FIG. 10(c) is a diagram illustrating the rear panel of FIG. 10(a) spread out on a plane.

FIG. 11 is a diagram illustrating a third modified example of the chest protecting cushion illustrated in FIG. 3.

FIG. 12 is a diagram independently illustrating a chest protecting cushion in FIG. 11.

FIG. 12(a) is a perspective view of the chest protecting cushion of FIG. 11 in an expanded and deployed state.

FIG. 12(*b*) is a schematic cross-sectional view illustrating an internal structure of the chest protecting cushion of FIG. 12(*a*).

FIG. 13 is a diagram illustrating a second modified example of the driver seat airbag device illustrated in FIG. 2.

FIG. 14 is a diagram illustrating an outline of an airbag cushion in FIG. 13.

FIG. 14(*a*) is a perspective view of the airbag cushion in an expanded and deployed state in FIG. 13.

FIG. 14(*b*) is a diagram illustrating the center panel in FIG. 14(*a*) spread out on a plane.

FIG. 14(*c*) is a diagram illustrating the side panel in FIG. 14(*a*).

FIG. 15 is a diagram illustrating a third modified example of the driver seat airbag device illustrated in FIG. 2.

FIG. 16 is a diagram illustrating an outline of an airbag cushion in FIG. 15.

FIG. 16(*a*) is a perspective view of the airbag cushion of FIG. 15 in an expanded and deployed state.

FIG. 16(*b*) is a diagram illustrating the center panel in FIG. 16(*a*) spread out on a plane.

FIG. 16(*c*) is a diagram illustrating the side panel in FIG. 16(*a*).

FIG. 17 is a diagram applying an internal tether to each of the airbag cushions in FIG. 14(*a*) and FIG. 16(*a*).

FIG. 17(*a*) illustrates each panel of the airbag cushion in FIG. 14(*a*) in a transparent manner, and a pair of internal tethers provided therein.

FIG. 17(*b*) illustrates each panel of the airbag cushion in FIG. 16(*a*) in a transparent manner, and a pair of internal tethers provided therein.

FIG. 18 is a diagram applying an internal panel to the airbag cushion in FIG. 14(*a*).

FIG. 18(*a*) illustrates each panel of the airbag cushion in FIG. 14(*a*) in a transparent manner, and an internal panel provided therein.

FIG. 18(*b*) illustrates an internal panel in a different position than the internal panel in FIG. 18(*a*).

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating the outline of a driver seat airbag apparatus 100 according to an embodiment of the present invention. FIG. 1(*a*) is a diagram illustrating a vehicle before activation of the driver's seat airbag device 100. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The driver's seat airbag device 100 is applied in the present embodiment as the driver airbag for the driver's seat for vehicles with a steering wheel on a left side (front row left side seat 102). Hereinafter, descriptions are made assuming the front row left side seat 102, for example, a vehicle outer side in the vehicle width direction (hereinafter, vehicle outer side) refers to a left side of the vehicle, and an inner side in the vehicle width direction (hereinafter, vehicle inner side) refers to a right side of the vehicle.

A yoke steering wheel 106 installed in a driver seat in the present embodiment is assumed to be of a configuration in which an operation of the occupant is converted into an electrical signal and transmitted to the wheel. The yoke steering wheel 106 has a rim 114 of a shape other than a circular ring shape, and is different in shape from a conventional steering wheel with a circular rim. The rim 114 accepts an operation of rotating about a central hub 108, but unlike a conventional circular rim, a rotating operation at a large angle is not necessary, and therefore, there is no need to hold with the left or right hand. Therefore, the rim 114 is shaped to be present only on left, right, and lower sides of the hub 108, and no structure is present on an upper side of the hub 108.

FIG. 1(*b*) is a diagram illustrating an airbag cushion provided with the driver seat airbag device 100 after expansion and deployment. In the present embodiment, two airbag cushions are provided: a lower chest protecting cushion 120 and an upper head protecting cushion 122. The chest protecting cushion 120 primarily restrains a chest 128 and abdomen 130 of the occupant 124 (see FIG. 2), and the head protecting cushion 122 restrains a head 126 of the occupant 124. The driver seat airbag device 100 uses the chest protecting cushion 120 and the head protecting cushion 122 to restrain the occupant 124 seated in the seat 102 from the front.

FIG. 2 is a diagram illustrating the driver seat airbag device 100 in FIG. 1(*b*) and the occupant 124 seated in the seat 102. In FIG. 2, the driver seat airbag device 100 and the occupant 124 are illustrated as viewed from a left side in the vehicle width direction. In the present embodiment, the chest protecting cushion 120 and the head protecting cushion 122 are separated from each other. The chest protecting cushion 120 is configured to expand and deploy from the center of the yoke steering wheel 106, and the head protecting cushion 122 is configured to expand and deploy from the an upper portion of an instrument panel 104.

The chest protecting cushion 120 has a smaller gas capacity than the head protecting cushion 122 and expands and deploys rearward of the yoke steering wheel 106. The chest protecting cushion 120 expands and deploys quickly into a narrow space between the yoke steering wheel 106 and the chest 128 of the occupant 124 by reducing a gas capacity thereof, preventing the chest 128 and abdomen 130 of the occupant 124 from contacting the yoke steering wheel 106.

The chest protecting cushion 120 is housed in the central hub 108 (see FIG. 1(*a*)) of the yoke steering wheel 106 in a configuration folded, wrapped, or the like, along with a chest portion inflator 132. The chest portion inflator 132 is a device that supplies gas to the chest protecting cushion 120, and upon receiving the gas, the chest protecting cushion 120 opens a cover 110 of the hub 108 and expands and deploys.

The head protecting cushion 122 when expanded and deployed has a larger gas capacity than the chest protecting cushion 120, in other words, volume when expanded and deployed, and extends from an upper portion of the chest protecting cushion 120 to an upper surface 134 of the instrument panel 104. The head protecting cushion 122, in addition to having a large volume, is supported on a front side between the upper surface 134 of the instrument panel 104 and a windshield 136, so as to suitably restrain the head 126 of the occupant 124 approaching from the rear.

The head protecting cushion 122 is stored in the upper portion of the instrument panel 104 toward the front of the vehicle from the yoke steering wheel 106 in a state folded, wrapped, or the like, along with a head portion inflator 138. The head portion inflator 138 is a device that supplies gas to the head protecting cushion 122, and upon receiving the gas, the head protecting cushion 122 opens a predetermined cover provided on the upper surface 134 of the instrument panel 104 and expands and deploys.

For example, a disc type can be used as the chest portion inflator 132 and the head portion inflator 138, for example. Each inflator has a portion where a gas discharge port is formed inserted into each cushion, and supplies gas to each cushion due to an impact detection signal sent from the vehicle side. Each inflator is provided with a plurality of stud bolts, which are fastened and secured to predetermined locations inside the yoke steering wheel 106 and on the upper portion of the instrument panel 104, respectively.

In the present embodiment, the chest protecting cushion 120 and the head protecting cushion 122 are configured to be separated, and are provided with the chest portion inflator 132 and head portion inflator 138, respectively. The chest portion inflator 132 and head portion inflator 138 can have different outputs and activation timings. For example, the chest protecting cushion 120 has a small gas capacity, and therefore, a small and inexpensive inflator with low output can be used for the chest portion inflator 132, thereby reducing costs. Furthermore, for example, the actuation timing of the chest portion inflator 132 can be accelerated to quickly restrain the chest 128, while delaying the activation timing of the head portion inflator 138 from that of the chest portion inflator 132 to restrain the head 126 at an appropriate timing.

Note that examples of currently prevailing inflators include: types filled with a gas generating agent and that burn the agent to generate a gas; types filled with a compressed gas and supply the gas without generating heat; hybrid types that utilize both a combustion gas and a compressed gas; and the like. Any type of inflator can be used as the chest portion inflator 132 and head portion inflator 138.

FIG. 3 is a diagram illustrating an outline of the chest protecting cushion 120 in FIG. 2. FIG. 3(a) is a perspective view of the chest protecting cushion 120 in an expanded and deployed state. The chest protecting cushion 120 is prepared in a shape similar to a flat semicircle by joining a front panel 140 on the occupant 124 (see FIG. 2) side and a rear panel 142 on the yoke steering wheel 106 side.

FIG. 3(b) is a diagram illustrating the front panel 140 of FIG. 3(a) spread out on a plane. The front panel 140 has a shape close to a semicircle and functions as a restraining surface that restrains the occupant 124 when the chest protecting cushion 120 is expanded and deployed.

FIG. 3(c) is a diagram illustrating the rear panel 142 of FIG. 3(a) spread out on a plane. The rear panel 142 has a shape close to a semicircle with the same dimensions as the front panel 140, and functions as a reaction force surface that obtains a reaction force from the yoke steering wheel 106 (see FIG. 1(a)) when the chest protecting cushion 120 is expanded and deployed. A securing region 144 is formed on an upper side of the center of the rear panel 142 where the chest portion inflator 132 (see FIG. 2) is inserted and secured inside the yoke steering wheel 106.

FIG. 4 is a diagram illustrating an outline of the head protecting cushion 122 in FIG. 2. FIG. 4(a) is a perspective view of the head protecting cushion 122 in an expanded and deployed state. The head protecting cushion 122 is prepared in a shape that is long in the vehicle front-rear direction by joining side panels 146a, 146b in the vehicle width direction and a center panel 148 in the center.

FIG. 4(b) is a diagram illustrating the center panel 148 of FIG. 4(a) spread out on a plane. The center panel 148 has a long rectangular shape and has a securing region 150 formed on an end portion on one side where the head portion inflator 138 (see FIG. 2) is inserted and secured inside the instrument panel 104.

FIG. 4(c) is a diagram illustrating the side panel 146a in FIG. 4(a). The side panels 146a, 146b have the same configuration. Therefore, the left side panel 146a is representatively illustrated, spread out on a plane. The side panel 146a is long in the front-rear direction and gradually increases in height from a front side to a rear side. The side panel 146a having this shape allows the head protecting cushion 122 to easily enter between the upper surface 134 of the instrument panel 104 and the windshield 136 on the front side, which is shorter in height, and to receive the head 126 of the occupant 124 (see FIG. 2) on the rear side, which is taller in height.

FIG. 5 is a diagram illustrating a process of the driver seat airbag device 100 in FIG. 2 restraining the occupant 124. FIG. 5(a) is a diagram illustrating the driver seat airbag device 100 at the start of activation. In the present embodiment, when a predetermined sensor of the vehicle detects or predicts an impact, the chest protecting cushion 120 first starts to expand and deploy.

FIG. 5(b) illustrates a condition when the occupant in FIG. 5(a) moves toward the front of the vehicle. The driver seat airbag device 100 quickly restrains the chest 128 of the occupant 124 with the chest protecting cushion 120. In particular, with regard to the narrow space between the yoke steering wheel 106 and the occupant 124, early expansion and deployment of the chest protecting cushion 120 with a reduced gas capacity can prevent contact between the chest 128 and abdomen of the occupant 124 and the yoke steering wheel 106.

FIG. 5(c) illustrates a condition when the occupant 124 in FIG. 5(b) moves further toward the front of the vehicle. The head protecting cushion 122 contacts the head 126 of the occupant 124 from the front of the vehicle to restrain the head 126. The head protecting cushion 122 is supported on the front side by the upper surface 134 of the instrument panel 104 and the windshield 136, and therefore can efficiently absorb the load of the head 126 of the occupant 124 approaching from the rear.

The head protecting cushion 122 is set so as to complete expansion and deployment later than the chest protecting cushion 120. This is because the chest protecting cushion 120 restrains the chest 128 of the occupant 124 first, followed by the head protecting cushion 122 restraining the head 126 of the occupant 124. In general, when the head 126 of the occupant 124 is bent forward or rearward when restrained, a load applied on the occupant 124 is likely to increase due to the structure of the human body. With the present embodiment, by receiving the chest 128 of the occupant 124 and then receiving the head 126, the head 126 can be prevented from bending rearward or the like, and the occupant 124 can be fully restrained while reducing the load applied on the occupant 124.

FIG. 6 is an enlarged view of the driver seat airbag device 100 in FIG. 5(c). In the present embodiment, a rear wall 152, which is a rear side occupant restraining surface of the head protecting cushion 122, is set to be positioned more toward the front of the vehicle than a rear wall 154, which is a rear side occupant restraining surface of the chest protecting cushion 120. More specifically, at least a rear end (vertical line L2) of the rear wall 152 is positioned more toward the front of the vehicle than a rear end (vertical line L3) of the rear wall 154, even though the rear wall 152 of the head protecting cushion 122 may be partially positioned more toward the rear of the vehicle than the rear wall 154 of the chest protecting cushion 120. This configuration allows the chest protecting cushion 120 to contact the chest 128 of the occupant 124 first, and then the head protecting cushion 120 to contact the head 126. Therefore, the driver seat airbag device 100 is capable of restraining the occupant 124 in a stable posture without causing the head 126 of the occupant 124 to bend backwards or the like.

In the present embodiment, a boundary between the chest protecting cushion 120 and the head protecting cushion 122 is set at a height near an upper end P1 of the hub 108 of the yoke steering wheel 106. More specifically, the boundary between the chest protecting cushion 120 and the head protecting cushion 122 is set within a range of ±100 mm relative to the height (horizontal line L1) of the upper end P1 of the hub 108. An upper end of the rim 114 of the steering wheel 106 is also present within a range of ±100 mm of the height of the upper end P1 of the hub 108. In other words, the boundary between the chest protecting cushion 120 and the head protecting cushion 122 is set at a height near the upper end of the rim 114.

In the yoke steering wheel 106, a range of the rim 114 more on an upper side than the hub 108 may be omitted, such that a structure supporting the airbag cushion on the upper side of the hub 108 is not present. In this case, a conventional airbag cushion may cause the upper side to collapse toward the front of the vehicle when restraining the occupant 124 (see FIG. 2). Therefore, in the present embodiment, the range up to the upper end P1 of the hub 108 is protected by the chest protecting cushion 120, and a range thereabove is protected by the head protecting cushion 122. This configuration allows the driver seat airbag device 100 to fully restrain the chest 128 and head 126 of the occupant 124 without disrupting the posture of the airbag cushion, even when a yoke steering wheel 106 is adopted.

Note that the driver seat airbag device 100 of the present embodiment can also be applied to a conventional circular steering wheel. In this case, the head protecting cushion 122 also expands and deploys so as to go over an upper side of the rim of the steering wheel. The aforementioned driver seat airbag device 100 can fully restrain the head 126 and the chest 128 of the occupant 124 without being dependent on the shape of the steering wheel.

Modified Example

Modified examples of the aforementioned driver seat airbag device 100 and components thereof will be described below. In each of the modified examples illustrated in FIGS. 7 to 18 below, the same components as those already described are omitted from the description by labeling the components with the same symbol. Furthermore, the same names as the components described above shall have the same functions unless otherwise indicated even when labeled with a different symbol.

FIG. 7 is a diagram illustrating a first modified example (driver seat airbag device 200) of the driver seat airbag device 100 illustrated in FIG. 2. The driver seat airbag device 100 has a different configuration than the driver seat airbag device 100 of FIG. 2 from the perspective that a camera 202 capable of detecting the position of the occupant 124 and a control unit 204 that controls each inflator based on the position of the occupant detected by the camera 202 are provided.

The camera 202 detects the position of the head 126 of the occupant 124 and the like to determine the posture of the occupant 124. The control unit 204 controls the activation timing, output, and the like of the chest portion inflator 132 and the head portion inflator 138 based on the posture of the occupant 124 determined through the camera 202.

FIG. 8 is a diagram illustrating a process of the driver seat airbag device 200 in FIG. 7 restraining the occupant 124. FIG. 8(a) is a diagram illustrating the driver seat airbag device 200 at the start of activation. The driver seat airbag device 100 described with reference to FIG. 5 was configured such that the chest protecting cushion 120 expands and deploys first. On the other hand, in the driver seat airbag device 200, not only can the chest protecting cushion 120 be expanded and deployed first, but the head protecting cushion 122 can be expanded and deployed first depending on the situation.

When a predetermined sensor of the vehicle detects or predicts an impact, the occupant 124 may be in a non-regular seating position (commonly referred to as out-of-position) relative to the seat 102. For example, if the occupant 124 leans out of the seat 102 and is in close proximity to the yoke steering wheel 106, the chest protecting cushion 120 may not properly function. In this case, the camera 202 detects the position of the occupant 124 and the control unit 204 activates the head portion inflator 138 first. In some cases, the control unit 204 activates the head portion inflator 138 with a moderately reduced output. Thereby, the head protecting cushion 122 pushes the head 126 of the occupant 124 toward the rear of the vehicle with a non-burdensome force to secure a space between the occupant 124 and the yoke steering wheel 106.

FIG. 8(b) illustrates a condition where the occupant 124 in FIG. 8(a) moves toward the rear of the vehicle. The control unit 204 activates the chest portion inflator 132 at a timing when the head protecting cushion 122 pushes the occupant 124 back to the rear. With this configuration, a space between the yoke steering wheel 106 and the occupant 124 can be secured, and thus the chest protecting cushion 120 can be inserted between the occupant and the steering wheel.

FIG. 8(c) illustrates a condition where expansion and deployment of the chest protecting cushion 120 in FIG. 8(b) is completed. Even when the head protecting cushion 122 is expanded and deployed first as in the present embodiment, the chest 128 and head 126 of the occupant 124 can be fully restrained by the head protecting cushion 122 and the chest protecting cushion 120. In particular, if the occupant 124 is in a non-regular seating position and a prior prediction of an impact is detected, it is possible to prepare for an impact occurring later.

FIG. 9 is a diagram illustrating a first modified example (chest protecting cushion 220) of the chest protecting cushion 120 illustrated in FIG. 3. FIG. 9(a) is a perspective view of a chest protecting cushion 220 in an expanded and deployed state. The chest protecting cushion 220 is configured of a front panel 222 and a rear panel 224, and expands and deploys into a flat rectangular body.

FIG. 9(b) is a diagram illustrating the front panel 222 of FIG. 9(a) spread out on a plane. The front panel 222 has a rectangular shape and functions as a restraining surface that restrains the occupant when the chest protecting cushion 220 is expanded and deployed. The front panel 222 is bent at folding lines 222a, 222b and then joined to the rear panel 224 (see FIG. 9(c)).

FIG. 9(c) is a diagram illustrating the rear panel 224 of FIG. 9(a) spread out on a plane. The rear panel 224 is also rectangular, overlaps the front panel 222 (FIG. 9(b)) in an orientation where long sides intersect each other, and is bent at folding lines 224a, 224b and then joined to the front panel 222. The rear panel 224 functions as a reaction force surface that obtains reaction force from the yoke steering wheel 106 (see FIG. 1(a)) when the chest protecting cushion 220 is expanded and deployed. The securing region 144 is formed on an upper side of the center of the rear panel 224 where a chest portion inflator 112 (see FIG. 2) is inserted and secured inside the yoke steering wheel 106.

The square chest protecting cushion 220 (see FIG. 9(a)) can suitably restrain the chest 128 of the occupant 124 in the same manner as the chest protecting cushion 120 of FIG. 2. Furthermore, the chest protecting cushion 220 has a rectangular front panel 222 and rear panel 224, which provides a more favorable production ratio (yield) from materials than other complex shapes and is beneficial from the perspective of manufacturing costs.

FIG. 10 is a diagram illustrating a second modified example (chest protecting cushion 240) of the chest protecting cushion 120 illustrated in FIG. 3. FIG. 10(a) is a perspective view of a chest protecting cushion 240 in an expanded and deployed state. The chest protecting cushion 240 is configured of a front panel 242 and a rear panel 244, and expands and deploys into a flat circular shape.

FIG. 10(b) is a diagram illustrating the front panel 242 of FIG. 10(a) spread out on a plane. The front panel 242 has a circular shape and functions as a restraining surface that restrains the occupant when the chest protecting cushion 240 is expanded and deployed.

FIG. 10(c) is a diagram illustrating the rear panel 244 of FIG. 10(a) spread out on a plane. The rear panel 244 is circular, has the same dimensions as the front panel 242 (see FIG. 10(b)), and is joined to the front panel 242.

The rear panel 244 functions as a reaction force surface that obtains reaction force from the yoke steering wheel 106 (see FIG. 1(a)) when the chest protecting cushion 240 is expanded and deployed. A securing region 144 is formed on the center of the rear panel 244 where a chest portion inflator 112 (see FIG. 2) is inserted and secured inside the yoke steering wheel 106.

The circular chest protecting cushion 240 (see drawings) can suitably restrain the chest 128 of the occupant 124 in the same manner as the chest protecting cushion 120 of FIG. 2. Even the circular chest protecting cushion 240 can suitably restrain the occupant 124 without disrupting the posture when expanded, for example, by limiting dimensions to fit within a range overlapping the yoke steering wheel 106.

FIG. 11 is a diagram illustrating a third modified example (chest protecting cushion 260) of the chest protecting cushion 120 illustrated in FIG. 3. FIG. 11 illustrates a chest protecting cushion 260, corresponding to FIG. 2. The chest protecting cushion 260 is housed along with a chest portion inflator 262 in a lower portion of the instrument panel 104 more toward the front of the vehicle than the yoke steering wheel 106, and expands and deploys therefrom to reach behind the yoke steering wheel 106.

The chest protecting cushion 260 is capable of protecting not only the chest 128 of the occupant 124, but also a knee 131. This configuration enables the chest protecting cushion 260 to be suitably mounted in the vehicle and also enables the occupant 124 to be more fully protected.

FIG. 12 is a diagram independently illustrating the chest protecting cushion in FIG. 11. FIG. 12(a) is a perspective view of the chest protecting cushion 260 in an expanded and deployed state in FIG. 11. The chest protecting cushion 260 is flat and expands and deploys into a curved shape. As illustrated in FIG. 11, the chest protecting cushion 260 curves and expands to reach behind the yoke steering wheel 106 and behind the head protecting cushion 122, similar to the chest protecting cushion 120 in FIG. 2.

FIG. 12(b) is a schematic cross-sectional view illustrating an internal structure of the chest protecting cushion 260 of FIG. 12(a). The chest protecting cushion 260 has a plurality of internal tethers 268 as well as a diffuser 266 that streamlines gas from the chest portion inflator 262 (see FIG. 11) inside a main panel 264 configured in a bag shape. The plurality of internal tethers 268 are inserted across various locations on the main panel 264 to limit expansion of each portion of the main panel 264, causing the main panel 264 to have an overall curved shape when expanded.

With the chest protecting cushion 260 of the present embodiment, a portion from the knee 131 to the abdomen 130 and the chest 128 of the occupant 124 can be suitably protected from contact with the instrument panel 104 and the yoke steering wheel 106. Furthermore, the chest protecting cushion 260 does not need to be stored in the yoke steering wheel 106, and therefore can be used with various forms of steering wheels from conventional circular steering wheels to next-generation steering wheels that accept electrical operation.

FIG. 13 is a diagram illustrating a second modified example (driver seat airbag device 300) of the driver seat airbag device 100 illustrated in FIG. 2. The driver seat airbag device 300 has a different configuration than the aforementioned embodiments from the perspective that a chest protecting cushion 302 and a head protecting cushion 304 are achieved by a single airbag cushion 306.

The airbag cushion 306 is stored in the yoke steering wheel 106 along with one inflator 301 in a condition where the chest protecting cushion 302 and the head protecting cushion 304 are integrally connected. The chest protecting cushion 302 expands and deploys behind the yoke steering wheel 106 to prevent the chest 128 and abdomen 130 of the occupant 124 from contacting the yoke steering wheel 106. The head protecting cushion 304 extends from an upper portion of the chest protecting cushion 302 to the upper surface 134 of the instrument panel 104, and a front side is supported between the upper surface 134 of the instrument panel 104 and the windshield 136 to restrain the head 126 of the occupant 124 approaching from the rear.

FIG. 14 is a diagram illustrating an outline of the airbag cushion 306 in FIG. 13. FIG. 14(a) is a perspective view of the airbag cushion 306 in an expanded and deployed state in FIG. 13. The airbag cushion 306 expands in an L-shape, with the chest protecting cushion 302 and the head protecting cushion 304 integrated. The airbag cushion 306 is prepared in the L-shape described above by joining a pair of side panels 308a, 308b on a side surface in the vehicle width direction and a center panel 310 in the center.

FIG. 14(b) is a diagram illustrating the center panel 310 in FIG. 14(a) spread out on a plane. The center panel 310 has a long rectangular shape and has a securing region 312 formed on an end portion on one side where the inflator 301 (see FIG. 13) is inserted and secured inside the yoke steering wheel 106.

FIG. 14(c) is a diagram illustrating the side panel 308a in FIG. 14(a). The side panels 308a, 308b have the same configuration. Therefore, the left side panel 308a is representatively illustrated, spread out on a plane. The side panel 308a has an L-shape extending to the chest protecting cushion 302 and the head protecting cushion 304 in FIG. 13.

As illustrated in FIG. 13, the airbag cushion 306 has the inflator 301 inserted into a range of the chest protecting cushion 302. Therefore, in a similar manner to the driver seat airbag device 100 illustrated in FIG. 5, the airbag cushion 306 has a configuration where expansion and deployment thereof starts first with the chest protecting cushion 302, and expansion and deployment of the head protecting cushion 304 is completed after the chest protecting cushion 302. Therefore, the airbag cushion 306 is also capable of restraining the chest 128 of the occupant 124 first with the chest protecting cushion 302, followed by restraining the head 126 of the occupant 124 with the head protecting cushion 304, and is capable of fully restraining the occupant 124 while preventing the head 126 from bending backward or the like.

FIG. 15 is a diagram illustrating a third modified example (driver seat airbag device 320) of the driver seat airbag device 100 illustrated in FIG. 2. Furthermore, an airbag cushion 322 that the driver seat airbag device 320 has is also similar to the airbag cushion 306 of FIG. 13, where the chest protecting cushion 324 and the head protecting cushion 326 are achieved by the single airbag cushion 322, which is stored in the yoke steering wheel 106. In particular, in the airbag cushion 322, a rear wall 328 of the head protecting cushion 326 is set to be positioned more toward the front of the vehicle than a rear wall 330 of the chest protecting cushion 324.

The chest protecting cushion 324 expands and deploys behind the yoke steering wheel 106 to prevent the chest 128 and abdomen 130 of the occupant 124 from contacting the yoke steering wheel 106. The head protecting cushion 326 extends from an upper portion of the chest protecting cushion 324 to the upper surface 134 of the instrument panel 104, and a front side is supported between the upper surface 134 of the instrument panel 104 and the windshield 136 to restrain the head 126 of the occupant 124 approaching from the rear.

FIG. 16 is a diagram illustrating an outline of the airbag cushion 322 in FIG. 15. FIG. 16(a) is a perspective view of the airbag cushion 322 in an expanded and deployed state in FIG. 15. The airbag cushion 322 is prepared in the L-shape described above by joining a pair of side panels 332a, 332b on a side surface in the vehicle width direction and a center panel 334 in the center.

FIG. 16(b) is a diagram illustrating the center panel 334 in FIG. 16(a) spread out on a plane. The center panel 334 has a long rectangular shape and has a securing region 336 formed on an end portion on one side where an inflator is inserted and secured inside the yoke steering wheel 106.

FIG. 16(c) is a diagram illustrating the side panel 332a in FIG. 16(a). The side panels 332a, 332b have the same configuration. Therefore, the left side panel 332a is representatively illustrated, spread out on a plane. The side panel 332a has an L-shape extending to a side surface of the chest protecting cushion 324 and the head protecting cushion 326 in FIG. 16(a).

As illustrated in FIG. 15, the airbag cushion 322 has the inflator 301 inserted into the chest protecting cushion 324. Therefore, in a similar manner to the driver seat airbag device 100 illustrated in FIG. 5, the airbag cushion 322 has a configuration where expansion and deployment thereof starts first with the chest protecting cushion 324, and expansion and deployment of the head protecting cushion 326 is completed after the chest protecting cushion 324. Therefore, the airbag cushion 322 is also capable of restraining the chest 128 of the occupant 124 (see FIG. 15) first with the chest protecting cushion 324, followed by restraining the head 126 of the occupant 124 with the head protecting cushion 326, and is capable of fully restraining the occupant 124 while preventing the head 126 from bending backward or the like.

As described above, in the airbag cushion 322, a rear wall 328 of the head protecting cushion 326 is set to be positioned more toward the front of the vehicle than a rear wall 330 of the chest protecting cushion 324. This configuration allows the airbag cushion 322 to restrain the chest 128 of the occupant 124 first, followed by the head 126. Therefore, the driver seat airbag device 320 is capable of restraining the occupant 124 in a stable posture without causing the head 126 of the occupant 124 to bend backwards or the like.

FIG. 17 is a diagram applying an internal tether to each of the airbag cushions in FIG. 14(a) and FIG. 16(a). FIG. 17(a) illustrates each panel of the airbag cushion 306 in FIG. 14(a) in a transparent manner, and a pair of internal tethers 340a, 340b provided therein. The internal tethers 340a, 340b are members that control the shape of the airbag cushion 306 during expansion and deployment.

The internal tethers 340a, 340b are connected to the center panel 310 so as to be inserted across corner portions of the L-shaped airbag cushion 306. The dimensions of the internal tethers 340a, 340b are set to dimensions that will tension and pull the center panel 310 together when the airbag cushion 306 is expanded and deployed. The internal tethers 340a, 340b regulate the expansion of the corner portions of the airbag cushion 306. With the internal tethers 340a, 340b, the airbag cushion 306 can be efficiently expanded and deployed in an L-shape, such that the chest protecting cushion 302 and the head protecting cushion 304 can function.

FIG. 17(b) illustrates each panel of the airbag cushion 322 in FIG. 16(a) in a transparent manner, and a pair of internal tethers 350a, 350b provided therein. The internal tethers 350a, 350b are connected to the center panel 334 so as to be inserted across into borders between the chest protecting cushion 324 and the head protecting cushion 326. The internal tethers 350a, 350b regulate the expansion of corner portions of the airbag cushion 322 and allow the chest protecting cushion 324 and the head protecting cushion 326 to properly function.

Note that the number of each of the internal tethers described above can be further increased. When a plurality of tethers are provided, the tethers are preferably provided at locations not directly contacted by gas from an inflator.

FIG. 18 is a diagram applying an internal panel to the airbag cushion 306 in FIG. 14(a). FIG. 18(a) illustrates each panel of the airbag cushion 306 in FIG. 14(a) in a transparent manner, and an internal panel 360 provided therein. The internal panel 360 is a component that controls the flow of gas inside the airbag cushion 306.

The internal panel 360 is connected to the center panel 310 so as to be inserted across from a bottom portion of the chest protecting cushion 302 to an upper portion of the airbag cushion 306 to divide the inside of the airbag cushion 306 into a lower portion chamber 362 and an upper portion chamber 364. The inner panel 360 is provided with a gas flow hole 366 to allow gas to pass therethrough. At this time, the securing region 312 into which the inflator 301 (see FIG. 13) is inserted is included in the upper portion chamber 364.

Therefore, the airbag cushion 306 is first supplied with gas in the upper portion chamber 364 followed by gas being supplied in the lower portion chamber 362. Thus, the airbag cushion 306 can be expanded and deployed first from the head protecting cushion 304, as in the driver seat airbag device 200 in FIG. 8, by the internal panel 360.

FIG. 18(b) illustrates an internal panel 370 in a different position than the internal panel 360 in FIG. 18(a). The internal panel 370 has a gas flow hole 376 and divides the inside of the airbag cushion 306 into a lower portion chamber 372 and an upper portion chamber 374. At this time, the securing region 312 into which the inflator is inserted is included in the lower portion chamber 372. Therefore, the airbag cushion 322 is first supplied with gas in the lower portion chamber 372, followed by gas being supplied in the upper portion chamber 374. Thereby, the airbag cushion 306 can be expanded and deployed first from the chest protecting cushion 302, as in the driver seat airbag device 100 in FIG. 5, by the internal panel 370.

Note that the internal tether in FIG. 17 and the internal panel in FIG. 18 can be implemented simultaneously with regard to a single airbag cushion. This configuration enables control of the shape by the internal tether and control of the gas flow by the internal panel to be simultaneously performed.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag for a driver seat for restraining an occupant during an emergency.

DESCRIPTION OF CODES

100 . . . Driver seat airbag device, 102 . . . Seat, 104 . . . Instrument panel, 106 . . . Yoke steering wheel, 108 . . . Hub, 110 . . . Hub cover, 114 . . . Rim, 120 . . . Chest protecting cushion, 122 . . . Head protecting cushion, 124 . . . Occupant, 126 . . . Head, 128 . . . Chest, 130 . . . Abdomen, 131 . . . Knee, 132 . . . Chest portion inflator, 134 . . . Upper surface, 136 . . . Windshield, 138 . . . Head portion inflator, 140 . . . Front panel, 142 . . . Rear panel, 144 . . . Securing region, 146a, 146b . . . Side panel, 148 . . . Center panel, 150 . . . Securing region, 152 . . . Rear wall of head protecting cushion, 154 . . . Rear wall of chest protecting cushion, 200 . . . Driver seat airbag device of first modified example, 202 . . . Camera, 204 . . . Control unit, 220 . . . Chest protecting cushion of first modified example, 222 . . . Front panel, 222a, 222b . . . Folding line of front panel, 224 . . . Rear panel, 224a, 224b . . . Line of rear panel, 240 . . . Chest protecting cushion of second modified example, 242 . . . Front panel, 244 . . . Rear panel, 260 . . . Chest protecting cushion of third modified example, 262 . . . Chest portion inflator, 264 . . . Main panel, 266 . . . . Diffuser, 268 . . . Internal tether, 300 . . . Driver seat airbag device of second modified example, 301 . . . Inflator, 302 . . . Chest protecting cushion, 304 . . . Head protecting cushion, 306 . . . Airbag cushion, 308a, 308b . . . Side panel, 310 . . . Center panel, 312 . . . Securing region, 320 . . . Driver seat airbag device of third modified example, 322 . . . Airbag cushion, 324 . . . Chest protecting cushion, 326 . . . Head protecting cushion, 328 . . . Rear wall of head protecting cushion, 330 . . . Rear wall of chest protecting cushion, 332a, 332b . . . Side panel, 334 . . . Center panel, 336 . . . Securing region, 340a, 340b . . . Internal tether, 350a, 350b . . . Internal tether, 360 . . . Internal panel, 362 . . . Lower portion chamber, 364 . . . Upper portion chamber, 366 . . . Gas flow hole, 370 . . . Internal panel, 372 . . . Lower portion chamber, 374 . . . Upper portion chamber, 376 . . . Gas flow hole, P1 . . . Upper end of hub, L1 . . . Horizontal line passing through upper end of hub, L2 . . . Vertical line passing through rear end of rear wall of head protecting cushion, L3 . . . Vertical line passing through rear end of rear wall of chest protecting cushion

The invention claimed is:

1. A driver seat airbag device configured to constrain an occupant seated in a driver seat of a vehicle, comprising:
a chest protecting cushion that expands and deploys behind a steering wheel of the vehicle, wherein the chest protecting cushion is shaped as a portion of a circle with a flat upper portion, and wherein the chest protecting cushion extends downwards from a hub of the steering wheel; and
a head protecting cushion, separate from the chest protecting cushion, that expands and deploys adjacent to and above the chest protecting cushion, wherein the head protecting cushion includes a downward extending portion which extends downwards to contact the flat upper portion of the chest protecting cushion at a border between the chest protecting cushion and the head protecting cushion; wherein
the head protecting cushion extends from an upper surface of an instrument panel to the border when expanded and deployed, wherein the head protecting cushion is configured to contact and restrain a head of the occupant from the front, and wherein the border is located within 100 mm of a height of an upper end of the hub of the steering wheel.

2. The driver seat airbag device according to claim 1, wherein the volume of the head protecting cushion when expanded and deployed is larger than the volume of the chest protecting cushion when expanded and deployed.

3. The driver seat airbag device according to claim 1, wherein the border between the chest protecting cushion and the head protecting cushion is set at the height of the upper end of the hub of the steering wheel.

4. The driver airbag device according to claim 1, wherein a rear wall of the head protecting cushion is positioned more toward the front of the vehicle than a rear wall of the chest protecting cushion.

5. The driver airbag device according to claim 1, wherein a rear end of a rear wall of the head protecting cushion is positioned more toward the front of the vehicle than a rear end of a rear wall of the chest protecting cushion.

6. The driver airbag device according to claim 1, wherein the head protecting cushion completes expansion and deployment later than the chest protecting cushion.

7. The driver airbag device according to claim 1, wherein the head protecting cushion is configured to contact the occupant before the chest protecting cushion.

8. The driver seat airbag device according to claim 1, wherein the head protecting cushion is stored in an upper portion of the instrument panel more toward the front of the vehicle than the steering wheel.

9. The driver seat airbag device according to claim 1, further comprising:
- a chest portion inflator that supplies gas to the chest protecting cushion;
- a head portion inflator that supplies gas to the head protecting cushion;
- a camera capable of detecting the position of the occupant; and
- a control unit that controls the activation start time of the chest portion inflator and the head portion inflator, respectively, based on the position of the occupant detected by the camera.

* * * * *